United States Patent
Campbell et al.

(10) Patent No.: US 7,404,001 B2
(45) Date of Patent: Jul. 22, 2008

(54) VIDEOPHONE AND METHOD FOR A VIDEO CALL

(75) Inventors: Robert Craig Campbell, Cranberry Township, PA (US); David Markham Drury, Pittsburgh, PA (US); Peter D. Hill, Monroeville, PA (US); Richard E. Huber, Harmony, PA (US); Brian Rosen, Mars, PA (US); John P. Strait, Pittsburgh, PA (US)

(73) Assignee: Ericsson AB, Stockholm (SE)

( * ) Notice: Subject to any disclaimer, the term of this patent is extended or adjusted under 35 U.S.C. 154(b) by 54 days.

(21) Appl. No.: 10/114,402

(22) Filed: Mar. 27, 2002

(65) Prior Publication Data

US 2007/0186002 A1  Aug. 9, 2007

(51) Int. Cl.
G06F 15/16 (2006.01)
(52) U.S. Cl. .................. 709/231; 709/244; 709/246; 725/119
(58) Field of Classification Search ............. 709/223, 709/231, 244, 246; 725/119
See application file for complete search history.

(56) References Cited

U.S. PATENT DOCUMENTS

| | | | |
|---|---|---|---|
| 5,689,641 A | 11/1997 | Ludwig et al. | |
| 6,678,740 B1 * | 1/2004 | Rakib et al. | 709/247 |
| 2001/0034222 A1 | 10/2001 | Roustaei et al. | |
| 2002/0186660 A1 * | 12/2002 | Bahadiroglu | 370/248 |
| 2003/0065805 A1 * | 4/2003 | Barnes | 709/231 |
| 2003/0101253 A1 * | 5/2003 | Saito et al. | 709/223 |
| 2003/0189922 A1 * | 10/2003 | Howe | 370/352 |

FOREIGN PATENT DOCUMENTS

| | | |
|---|---|---|
| EP | 0 905 976 A | 3/1999 |
| WO | WO 95 10157 A | 4/1995 |
| WO | WO 01 39497 A | 5/2001 |

* cited by examiner

*Primary Examiner*—Jason D Cardone
*Assistant Examiner*—Adnan M Mirza
(74) *Attorney, Agent, or Firm*—Ansel M. Schwartz

(57) ABSTRACT

A videophone. The videophone can include an imaging mechanism for taking a video picture of a scene. The videophone can include a mechanism for producing a first video stream of the scene and a second video stream of the scene from the video picture and sending the first video stream and the second video stream onto a network at the same time, the producing mechanism in communication with the imaging mechanism. The videophone can include a mechanism for receiving a plurality of video streams of different scenes from a network. The videophone can include a mechanism for displaying the different scenes of the plurality of video streams alongside each other. A method for a video call.

40 Claims, 13 Drawing Sheets

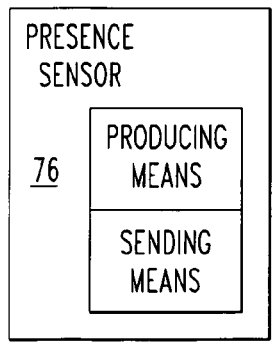
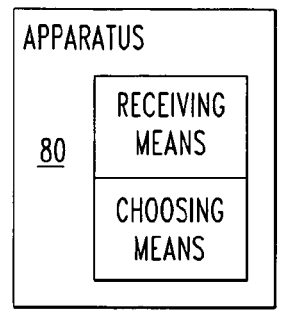
FIG.12
FIG.14
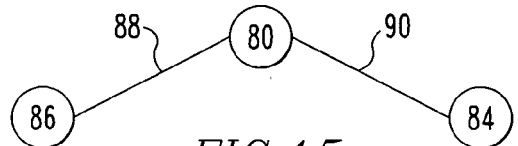
FIG.15
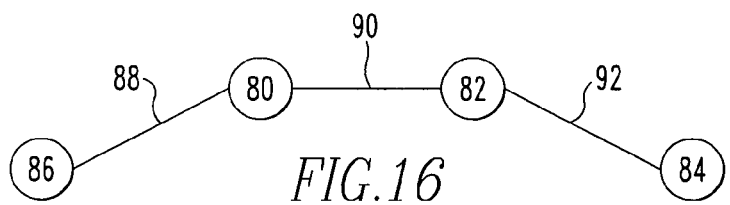
FIG.16
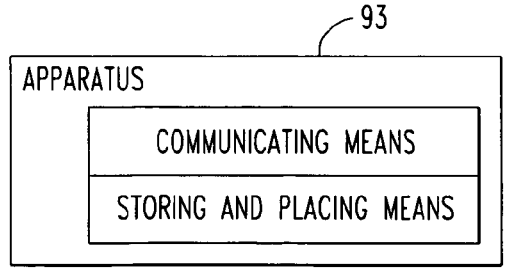
FIG.17

VIDEOPHONE AND METHOD FOR A VIDEO CALL

CROSS-REFERENCE

This application is related to contemporaneously filed U.S. design patent application Ser. No. 29/158,247 titled "Videophone", by Jeremiah Peter O'Leary, Martin Thaler and Rodney Hal Monson, having incorporated by reference herein; and is related to contemporaneously filed U.S. patent application Ser. No. 10/115,323 titled "Method and Apparatus for Displaying Images in Combination With Taking Images", by Robert Craig Campbell, David Markham Drury, Richard E. Huber and John P. Strait, having incorporated by reference herein.

FIELD OF THE INVENTION

The present invention is related to a videophone. More specifically, the present invention is related to a videophone having elements of high resolution, high frame rate, full duplex, low delay, video, audio, stereo echo cancellation, self serving multiparty conferencing services, presence services, shared surface services and TV distribution.

BACKGROUND OF THE INVENTION

Geographically dispersed teams are reality in essentially every large company (Marconi, Ford, Boeing, IBM), any company who acquires another, and many start-ups. Travel is expensive, inefficient, and undesirable (the romance is gone). Resources (people) are expensive, limited, and are difficult to relocate.

There is a need for substantially improved communication between members of a geographically dispersed team by upgrading the communications systems available to team members to more closely mimic the range of communications they would have if they were collocated. The telephone as it is known today in regard to audio communication has become a natural extension of everyday life and meets many of the needs of team members or users to communicate with each other. An upgraded communications system must be as reliable and second nature to users as the telephone, and essentially be a telephone but add at least a dimension of video so it too is second nature to a user. The quality of audio and video, including delay of such communications systems, must be sufficient to encourage users to communicate naturally. The screen, speakers, microphone, and possible thousands of miles between the users should disappear.

The communication environment needs to provide each user with the ability to "just know" who is in a conference, what the other users are doing, and when and how to talk to them. Users should be able to have "water cooler" impromptu discussions, even remote lunches, without the overhead of thinking about the mechanism.

All actions and features should be obvious, without the need for training. Target users include computer experts and novices, as well as telephone power users and minimalists. There should be a very low to nonexistent "geek factor." Information such as names, phone numbers, schedules, location, remote time, presence status, call history, etc., must be easily available. The instant availability of telephone numbers and the link to getting them dialed should make this communications system the preferred real-time source for such information. It should interface to existing contact information sources such as Exchange, PDA, etc., and appropriately be used to minimize user actions without compromising user control.

Low latency is a key factor in enabling natural communication, as anyone who has used a satellite link on a telephone call will know only too well. To date, there have been significant technical problems with latency in video communications where the total delay of the video encode, typical network delay and video decode produce unacceptable results. The RTP mechanisms have not produced an acceptably low jitter rate with low delay. The consequence is that current video conferencing technology does not achieve the transparency necessary for really effective communication. There has been no acceptable presentation for multi-user conferences created on a screen surface intended for the desktop. The weakness in existing teleconferencing systems is the communication effectiveness as the number of participants increases. The control, management, interface, and performance of the system tend to degrade, and the transparency of the media is lost, when more than two people are involved in the conference.

The present invention is intended to be a volume product that can replace the most common forms of desktop phones and provide a list of enhanced features to provide solutions to the problems identified above. The present invention adds real-time vision and other aides to the current communications environment and at last achieves a genuine sense of telepresence. In other words, the ability to interact remotely with one or more people in a much closer approximation to a physical meeting than can be achieved current day tools. The present invention provides for the following.

It has the potential to dramatically improve both the efficiency and effectiveness of communications within a geographically dispersed organization.

Efficiency will improve by including the visual dimension to communication, recognizing that we obtain up to 70% of communication content visually, and this is absent from audio only communication.

Efficiency will improve through the ability to immediately facilitate event driven (ad hoc) rather than planned communication as this former category represents some 70% of all local communication which we can now extend to remote communications.

Efficiency will improve from users having this tool continuously available on their desks for immediate use, like their current telephone, in comparison to most current video conferencing that are in dedicated rooms and have to be booked in advance.

Efficiency will improve through the distribution of 'presence' information, ensuring more communication attempts complete successfully.

Efficiency will improve by having separate communications and computing platforms simultaneously available to the user.

Efficiency will improve by reducing the time to create a relevant discussion group to resolve an issue, significantly speeding up the decision cycle and by reducing significantly the need to travel.

The reduction in travel not only frees up more productive time, but could save a great deal of cost in airline and hotel fares.

Effectiveness will improve by ensuring that the most relevant people are involved in a decision, and not just those "at hand."

Effectiveness will also improve because of the improved personal relationships that can develop when high quality vision is added to simple phone contact.

It will allow expertise available at a specific location to be "on-tap" anywhere within the organization at a moment's notice, making much more productive use of such expertise.

It could be the vehicle for much improved management to staff communication—from the senior company managers to the whole company, and help engender team spirit and commitment.

And as with any really new tool, clever folk will invent ways of exploiting it to the benefit of the organization we could not at this stage even guess at.

The present invention is an extension of the phone system that users are so familiar with, i.e., it is a communications platform and not a PC application. Instant access, reliability and simple intuitive functionality are some of the key attributes that come with it.

Some of the video collaboration products that currently exist are the following.

Microsoft NetMeeting. Anyone who tried to use it knows its limitations: it is excruciatingly slow. Its video is close to unusable. The audio is poor. The user interface is hard to understand for all but basic calls.

Polycom, ViaVideo™. Viavideo™ is an H.323 appliance that contains a camera and some audio processing in a monitor-top housing with a USB connection to a PC. The product generates H.261 quality video at up to 384 K with the output on the PC screen in a window, and a screen emulation of an IR remote control for user interface. The video is acceptable, with the camera relatively poor. Audio quality is acceptable-echo cancellation is available, but the overall impression does not achieve the necessary transparency needed for effective communication. What the video does is to offer a level of video quality at a new price point, around $600. There is no presence, no telephone integration, no CTI. The size of the window of the PC screen limits what else one can do.

Webex, is a web-based conferencing product offered primarily as a service. The primary problem with it is bandwidth, because the current product is Internet (capital I) based. The present implementation is server based, which further limits what it can do. Webex has much more primitive shared surface options than NetMeeting, and offers low quality audio, no video, no CTI, no presence, etc.

Teraglobal is based on an Apple platform, which is presented not as a videophone but an entire application platform of which communication is but one capability. The technology is intimately tied to this platform and the underlying "DigitalDNA" Motorola PowerPC processor it runs on. The entire product is proprietary, having no commonality with any other elements. They have had to resort to building their own e-mail, calendaring and scheduling programs in order to obtain the integration that the need. It has Mbits/sec). Its survey tools conference control facilities, and similar capabilities push it into a large conference domain. Group collaboration does not require such capability and having to support that many participants degrades the user experience in comparison to smaller numbers of participants significantly. For example, the usual conference presentation is a single large view of the speaker, which is semi-automatically "handed-off," with thumbnails of other participants updated every few seconds.

The present invention consists of several end terminals (appliances), a set of servers which provide features not built into the appliances, and a set of gateways that connect the products to existing facilities and outside PSTN services. The basic functionality provided by the present invention is:

Telephony Services, with video available on all "on-net" calls, very high quality audio and video Multiparty Conference Services, audio and video, ad hoc or prescheduled, completely self-serve, fully integrated into the telephony services Presence Services—with a variety of tools to determine availability for collaboration Shared Surface Services—electronic whiteboard, application sharing, document sharing, presentation broadcast via linked applications on an associated PC Other value added services such as broadcast video TV distribution.

The present invention is your telephone with dramatic new functionality, not your computer trying to do what your telephone does. This allows full concurrent use of your computer for the things that it is good at, while providing a flexible but application specific appliance for communication. The user interface and physical design can be tuned for this application, providing an instant on, highly reliable communications device like our current phones, something that the PC will never be. This approach also provides control over the operating environment of the device, eliminating the support problems related to PC hardware and software configuration issues.

SUMMARY OF THE INVENTION

The present invention pertains to a videophone. The videophone comprises an imaging means for taking a video picture of a scene. The videophone comprises means for producing a first video stream of the scene and a second video stream of the scene from the video picture and sending the first video stream and the second video stream onto a network at the same time. The producing means is in communication with the imaging means. Preferably, the producing means can produce multiple video streams of the scene, with each of the video streams preferably different.

The present invention pertains to a method for making a video call. The method comprises the steps of taking a video picture of a scene. There is the step of producing a first video stream of the scene and a second video stream of the scene from the video picture. There is the step of sending the first video stream and the second video stream onto a network at the same time.

The present invention pertains to a videophone. The videophone comprises means for receiving a plurality of video streams of different scenes from a network. The videophone comprises means for displaying the different scenes of the plurality of video streams alongside each other. The receiving means is in communication with the displaying means.

The present invention pertains to a videophone. The videophone comprises means for receiving a plurality of video streams of different scenes from a network. The videophone comprises means for displaying the different scenes of the plurality of video streams at predetermined areas of various sizes at the same time. The displaying means is in communication with the receiving means.

The present invention pertains to a method for a video call. The method comprises the steps of receiving a plurality of video streams of different scenes from a network. There is the step of displaying the different scenes of the plurality of video streams at predetermined areas of various sizes at the same time.

The present invention pertains to a videophone. The videophone comprises means for receiving a plurality of video streams of different scenes from a network including at least one video stream of a television channel. The videophone comprises means for displaying at least one of the scenes of the plurality of video streams next to the television channel. The displaying means in communication with the receiving means.

The present invention pertains to a method for a video call. The method comprises the steps of receiving a plurality of video streams of different scenes from a network including at least one video stream of a television channel. There is the step of displaying at least one of the scenes of the plurality of video streams next to the television channel.

The present invention pertains to a videophone. The videophone comprises imaging means for taking a video picture of a scene. The videophone comprises means for producing a video stream of the scene, and preferably multiple video streams of the scene, from the video picture and sending the video stream or streams of the scene on a network to a plurality of destinations at the same time without using a conferencing bridge or MCU. The producing means is in communication with the imaging means.

The present invention pertains to a method for a video call. The method comprises the steps of taking a video picture of a scene. There is the step of producing a video stream of the scene from the video picture. There is the step of sending the video stream of the scene on a network to a plurality of destinations at the same time without using a conferencing bridge or MCU.

The present invention pertains to a videophone. The videophone comprises an imaging means for taking a video picture of a scene. The videophone comprises means for producing a video stream of the scene from the video picture using continuous P and sending the video stream onto a network, the producing means in communication with the imaging means.

The present invention pertains to a method for a video call. The method comprises the steps of taking a video picture of a scene. There is the step of producing a video stream of the scene from the video picture using continuous P and sending the video stream onto a network.

The present invention pertains to a videophone. The videophone comprises an imaging means for taking a video picture of a scene. The videophone comprises means for producing a video stream of the scene from the video picture, clipping areas of the scene where there is no user of the videophone and sending the video stream onto a network. The producing means is in communication with the imaging means.

The present invention pertains to a method for a video call. The method comprises the steps of taking a video picture of a scene. There is the step of producing a video stream of the scene from the video picture. There is the step of clipping areas of the scene where there is no user of the videophone. There is the step of sending the video stream onto a network.

The present invention pertains to a videophone. The videophone comprises an imaging means for taking a video picture of a scene. The videophone comprises means for producing a video stream of the scene from the video picture and an audio stream of the scene, and sending the video stream onto a network and the audio stream, only if there is noise above a predetermined threshold at the scene, onto the network. The producing means is in communication with the imaging means.

The present invention pertains to a method for a video call. The method comprises the steps of taking a video picture of a scene. There is the step of producing a video stream of the scene from the video picture and an audio stream of the scene. There is the step of sending the video stream onto a network and the audio stream, only if there is noise above a predetermined threshold at the scene, onto the network.

The present invention pertains to a videophone. The videophone comprises an imaging means for taking a video picture of a scene. The videophone comprises means for producing a video stream of the scene from the video picture and sending the video stream onto a network without frame buffering of the video stream except for packetization purposes. The producing means in communication with the imaging means.

The present invention pertains to a method for a video call. The method comprises the steps of taking a video picture of a scene. There is the step of producing a video stream of the scene from the video picture and sending the video stream onto a network without frame buffering of the video stream except for packetization purposes.

The present invention pertains to a presence sensor for a network. The presence sensor comprises means for producing a presence indicator of whether a person is in the scene. The presence sensor comprises means for sending the presence indicator to the network. The sending means is in communication with the producing means. Preferably, the sensor includes means for alerting the person in the scene that the presence indicator is going to be produced in a predetermined time.

The present invention pertains to a method for sensing presence for a network. The method comprises the steps of producing a presence indicator of whether a person is in a scene. There is the step of sending the presence indicator to the network. Preferably, there is the step of alerting the person in the scene that the presence indicator is going to be produced in a predetermined time.

The present invention pertains to a page for a touch screen to make a video call. The page comprises a list of personal contacts and their associated addresses (preferably SIP) for videophones or phones (preferably SIP) or telephone numbers or accessing conventional phones. The page comprises a button associated with each contact which when touched, places a call to the contact associated with the button. Preferably, the page includes a presence indicator associated with each contact identifying whether that contact is present at the associated (video) phone.

The present invention pertains to a method for making a video call. The method comprises the steps of touching a button on a page of a touch screen associated with a contact. There is the step of placing the video call to the contact at the address associated with the button. Preferably, there is the step of displaying a presence indicator associated with each contact identifying whether that contact is present and available at the associated (video) phone.

The present invention pertains to a method for communicating with a person or contact. The method comprises the steps of calling an address or phone number of the person. There is the step of leaving a video message with the videophone when prompted by the videophone.

The present invention pertains to a videophone. The videophone comprises means for prompting a video caller to leave a video message. The videophone comprises means for saving the video message until it is desired to be seen.

The present invention pertains to a videophone. The videophone comprises means for producing a video stream of a scene having a resolution of at least 640×480 and preferably at least 640×480 pixels, a delay of less than 100 ms and a frame rate of at least 25 frames per second. The videophone comprises means for producing an audio stream of the scene that is full duplex and is subject to stereo echo cancellation.

The present invention pertains to a method for communicating with a person. The method comprises the steps of producing a video stream of a scene having a resolution of at least 640×480 and preferably at least 720×480 pixels, a delay of less than 100 ms and a frame rate of at least 25 frames per second. There is the step of producing an audio stream of the scene that is full duplex and is subject to stereo echo cancellation. There is the step of sending the video stream and audio stream to a videophone of the person.

The present invention pertains to a videophone. The videophone comprises a display screen for displaying a video stream received from a network. The videophone comprises microphone means for receiving sound from a scene. The videophone comprises speaker means for playing an audio stream received from the network into the scene. The videophone comprises means for monitoring noise produced by the speaker means into the scene and adjusting the speaker means to maintain a desired level of noise produced by the speaker means. The monitoring means in communication with the speaker means and the microphone means.

The present invention pertains to a method for operating a videophone. The method comprises the steps of displaying a video stream received from a network on a display screen. There is the step of receiving sound from a scene by microphone means. There is the step of playing an audio stream received from the network with speaker means into the scene. There is the step of monitoring noise produced by the speaker means into the scene and adjusting the speaker means to maintain a desired level of noise produced by the speaker means.

The present invention pertains to a videophone. The videophone comprises means for recognizing a spoken command to make a video call to a destination. The videophone comprises means for making the video call and using the spoken command to announce the video call at the destination.

The present invention pertains to a method for making a video call. The method comprises the steps of recognizing a spoken command to make a video call to a destination by a videophone. There is the step of making the video call with the videophone and using the spoken command to announce the video call at the destination.

The present invention pertains to a videophone. The videophone comprises a plurality of individual display screens. The videophone comprises means for displaying different scenes of a plurality of video streams received from a network at the same time on the plurality of screens as though the plurality screens is one continuous screen. The displaying means in communication with the plurality of display screens.

The present invention pertains to a method for having a video call. The method comprises the steps of receiving a plurality of video streams of different scenes. There is the step of displaying the different scenes of the plurality of video streams on a plurality of display screens at the same time that are connected together as though the plurality of screens is one continuous screen.

The present invention pertains to a videophone. The videophone comprises first imaging means for taking a video picture of a scene. The videophone comprises second imaging means for taking a different video picture of the scene than the first imaging means. The videophone comprises means for producing at least a video stream and preferably multiple streams of the scene from either the video picture taken by the first imaging means or the second imaging means and sending the video stream or streams onto a network. The producing means in communication with the first imaging means or second imaging means.

The present invention pertains to a method for a video call. The method comprises the steps of taking a video picture of a scene with a first imaging means. There is the step of taking a video picture of the scene with a second imaging means. There is the step of producing a video stream of the scene from the video picture of either the first imaging means or the second imaging means and sending the video stream onto a network.

The present invention pertains to an apparatus for conferencing. The apparatus comprises means for receiving from a network N audio streams associated with noise from different locations, where N is an integer greater than or equal to 2. The apparatus comprises means for choosing M of the audio streams from the N audio streams, where M is an integer less than or equal to N. The apparatus comprises means for mixing and playing the M audio streams.

The present invention pertains to a system for conferencing. The system comprises a network. The system comprises N nodes connected to each other through the network, where N is greater than or equal to 3 and is an integer. Each node sends an audio stream to the network if there is noise above a threshold at the respective node. Each node plays M of the audio streams from the N nodes, where M is less than N and is an integer. Each node determines its respective threshold at a given time based on noise level of the M audio streams played at the given time at the node. The threshold is dynamic, and is determined independent and distributed among the N nodes, with each node not necessarily playing the M audio streams that any other node is playing.

The present invention pertains to a method for conferencing. The method comprises the steps of receiving from a network N audio streams associated with noise from different locations, where N is an integer greater than or equal to 3. There is the step of choosing M of the audio streams from the N audio streams, where M is an integer less than or equal to N 3. There is the step of mixing and playing the M audio streams.

The present invention pertains to an apparatus for conferencing. The apparatus comprises means for sending an audio stream to a network if the audio stream has noise above a threshold at a given time. The apparatus comprises means for dynamically determining the threshold as a function of noise of a plurality of received audio streams from the network at the given time.

The present invention pertains to a method for conferencing. The method comprises the steps of determining dynamically a threshold for sending an audio stream to a network as a function of noise of a plurality of received audio streams from the network. There is the step of sending the audio stream to the network if the audio stream has noise above the threshold.

BRIEF DESCRIPTION OF THE DRAWINGS

In the accompanying drawings, the preferred embodiment of the invention and preferred methods of practicing the invention are illustrated in which:

FIG. 12 is a block diagram of a presence sensor.

FIG. 14 is a block diagram of an apparatus of the present invention.

FIG. 15 is a schematic representation of a system of the present invention.

FIG. 16 is a schematic representation of another system of the present invention.

FIG. 17 is a schematic representation of an apparatus of the present invention.

DETAILED DESCRIPTION

Figure 1:
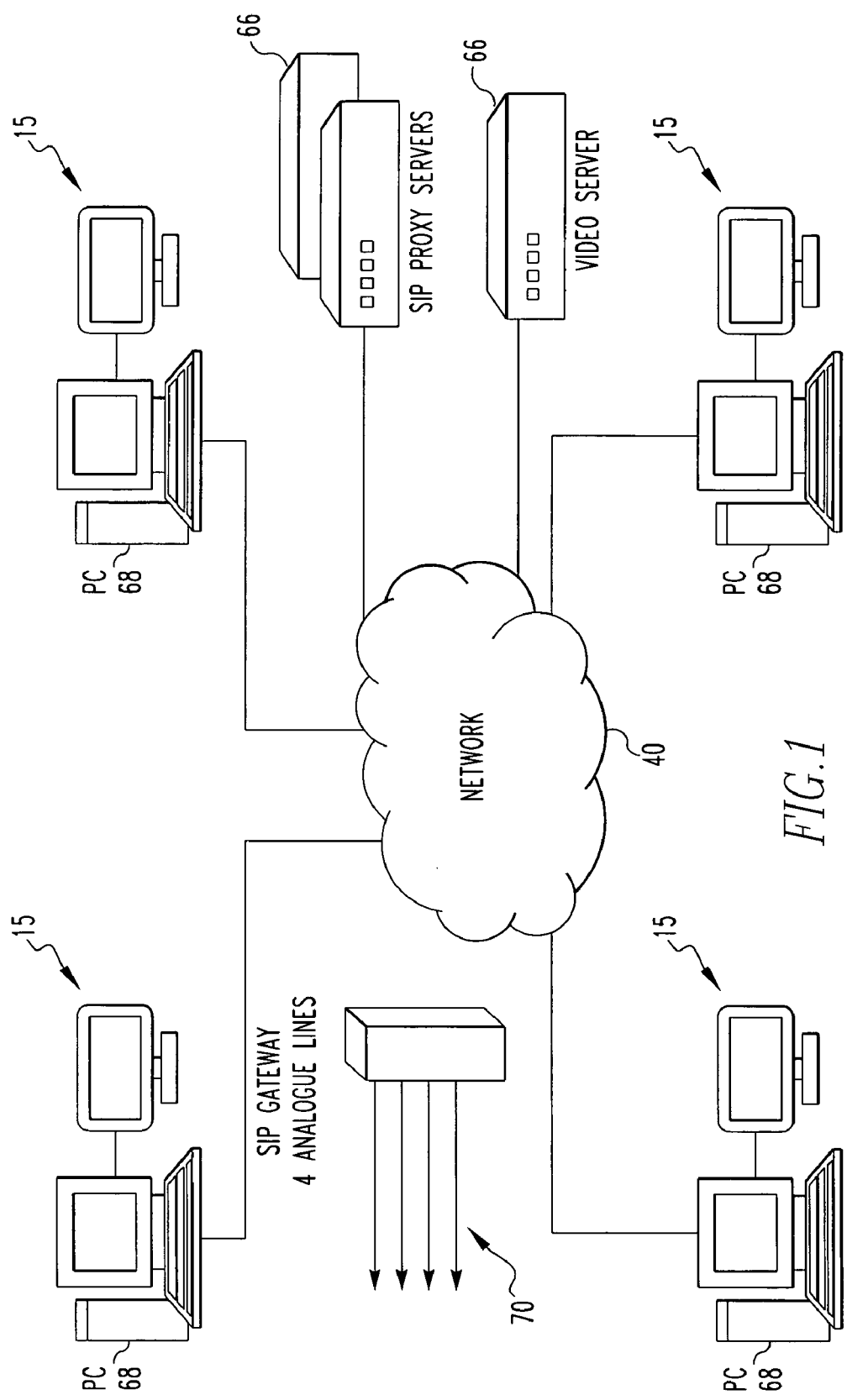
FIG. 1 is a schematic representation of a system of the present invention.
Figure 8A:
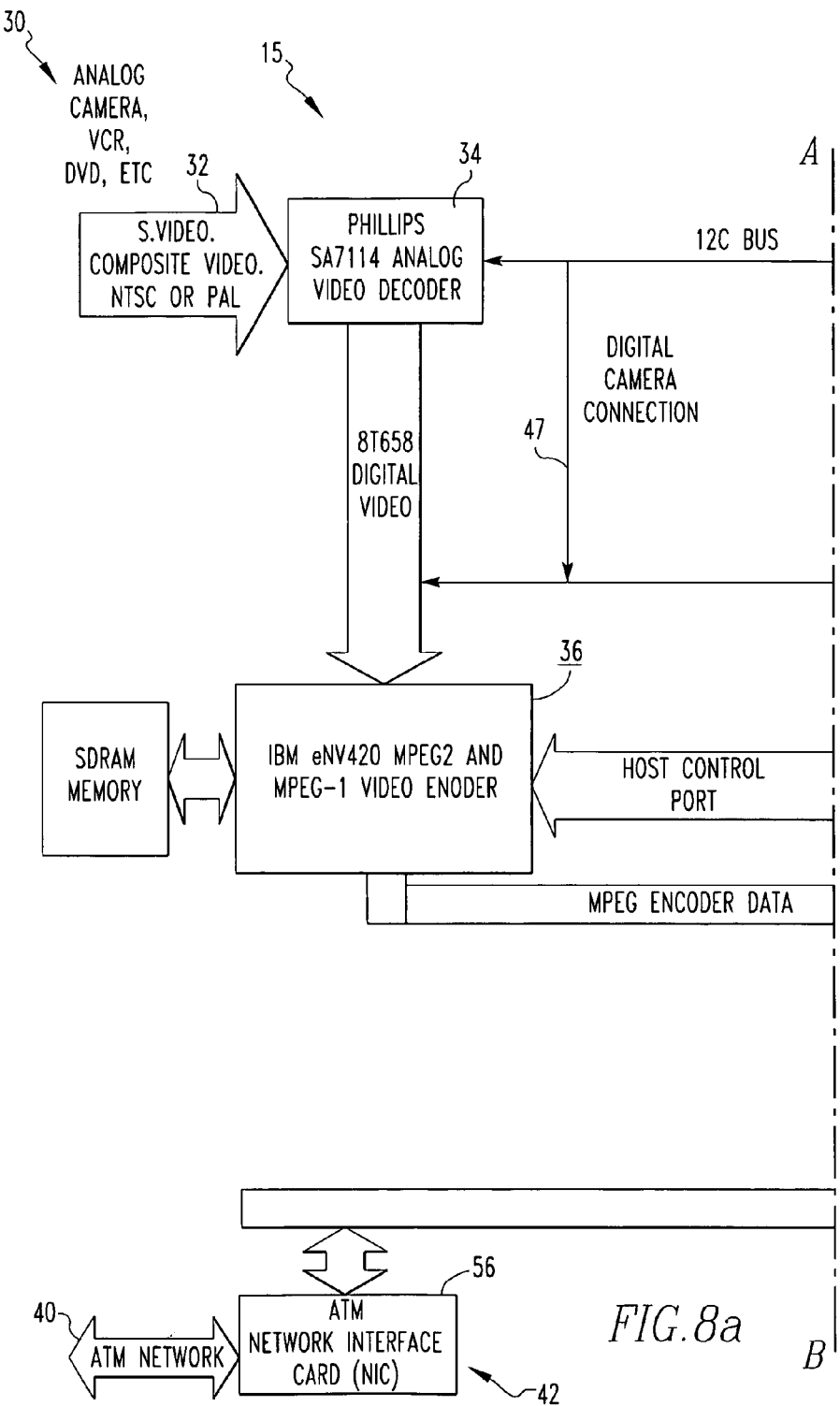
FIG. 8 is a block diagram of the videophone.
Figure 8B:
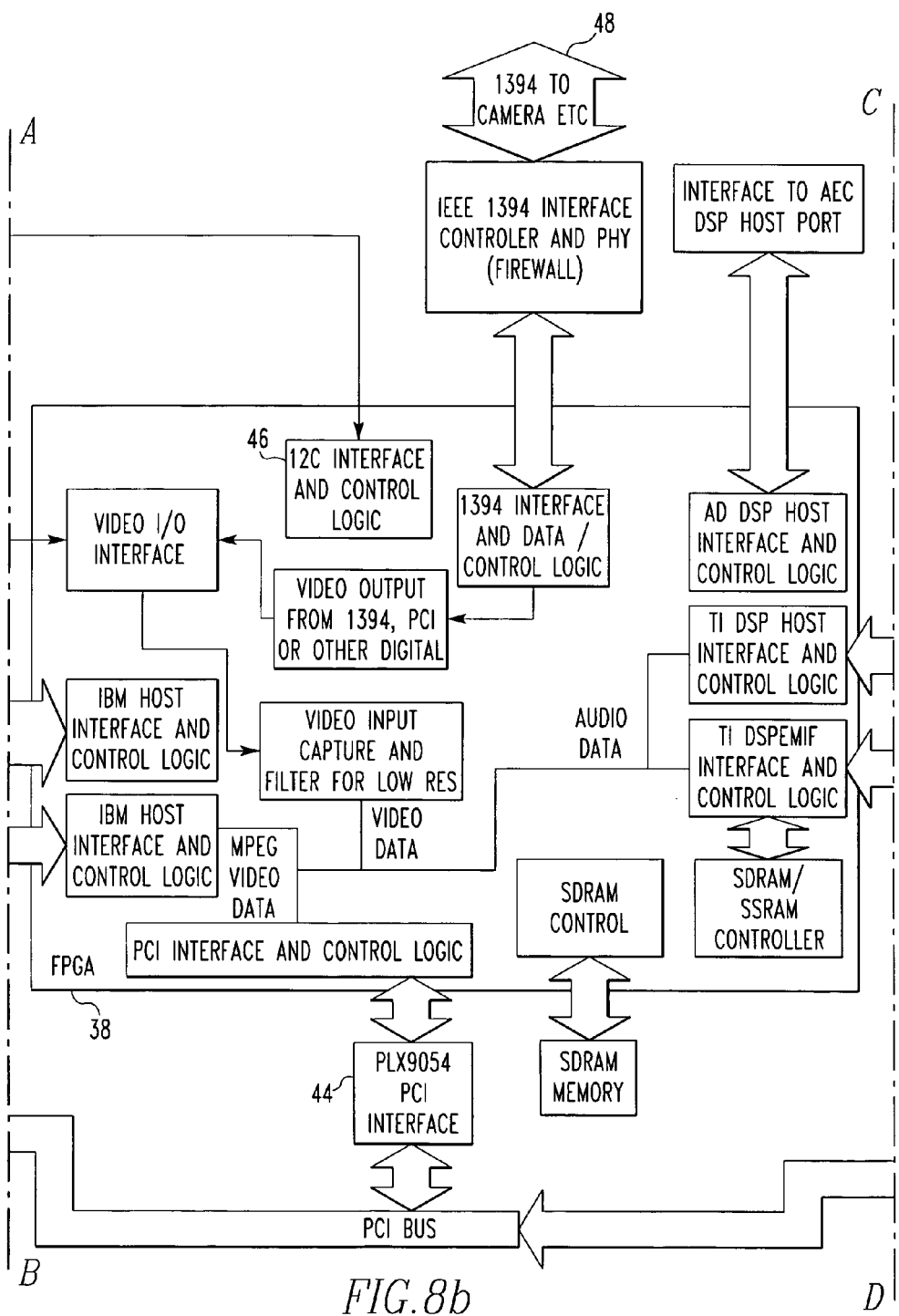
Figure 8C:
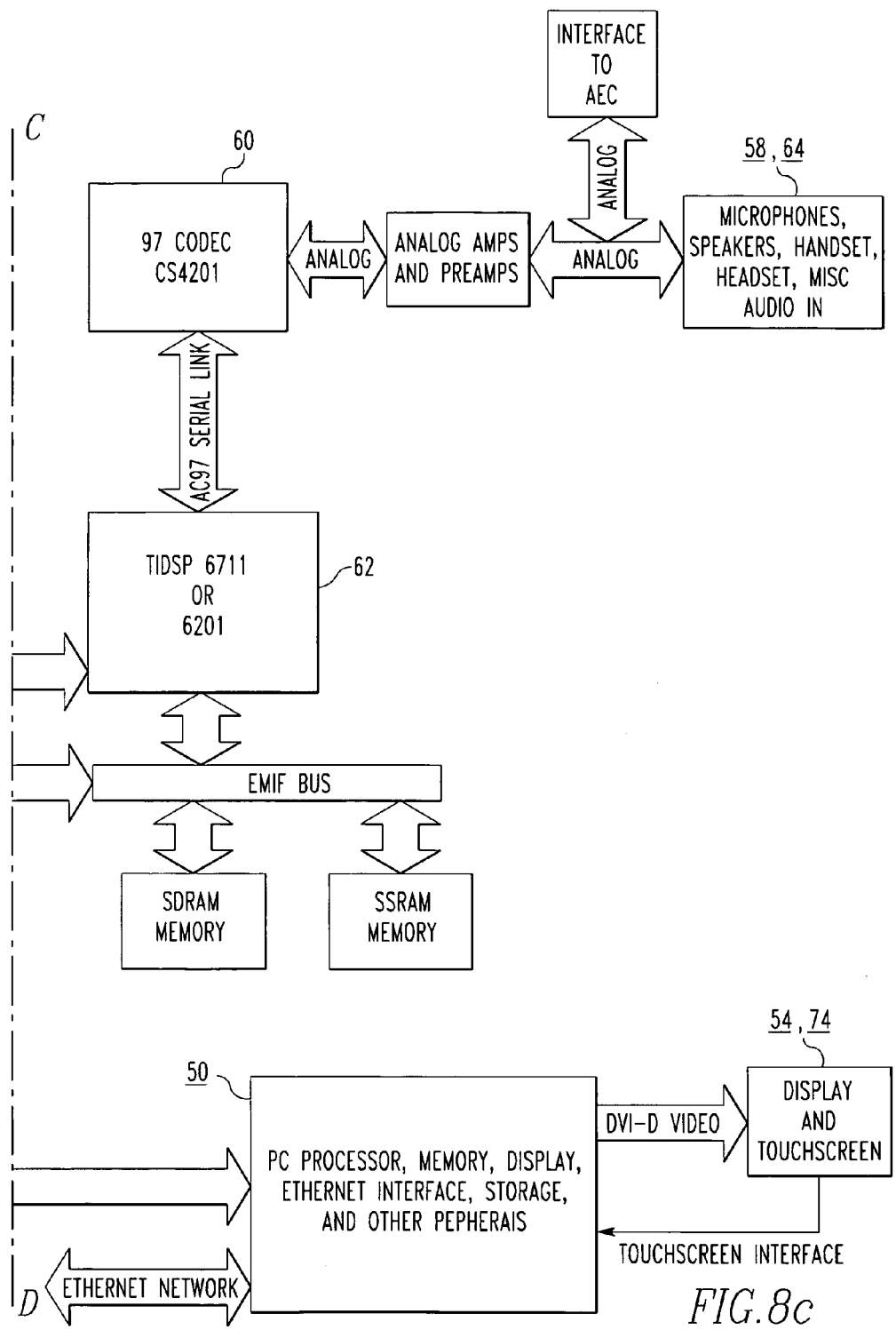
Figure 10:
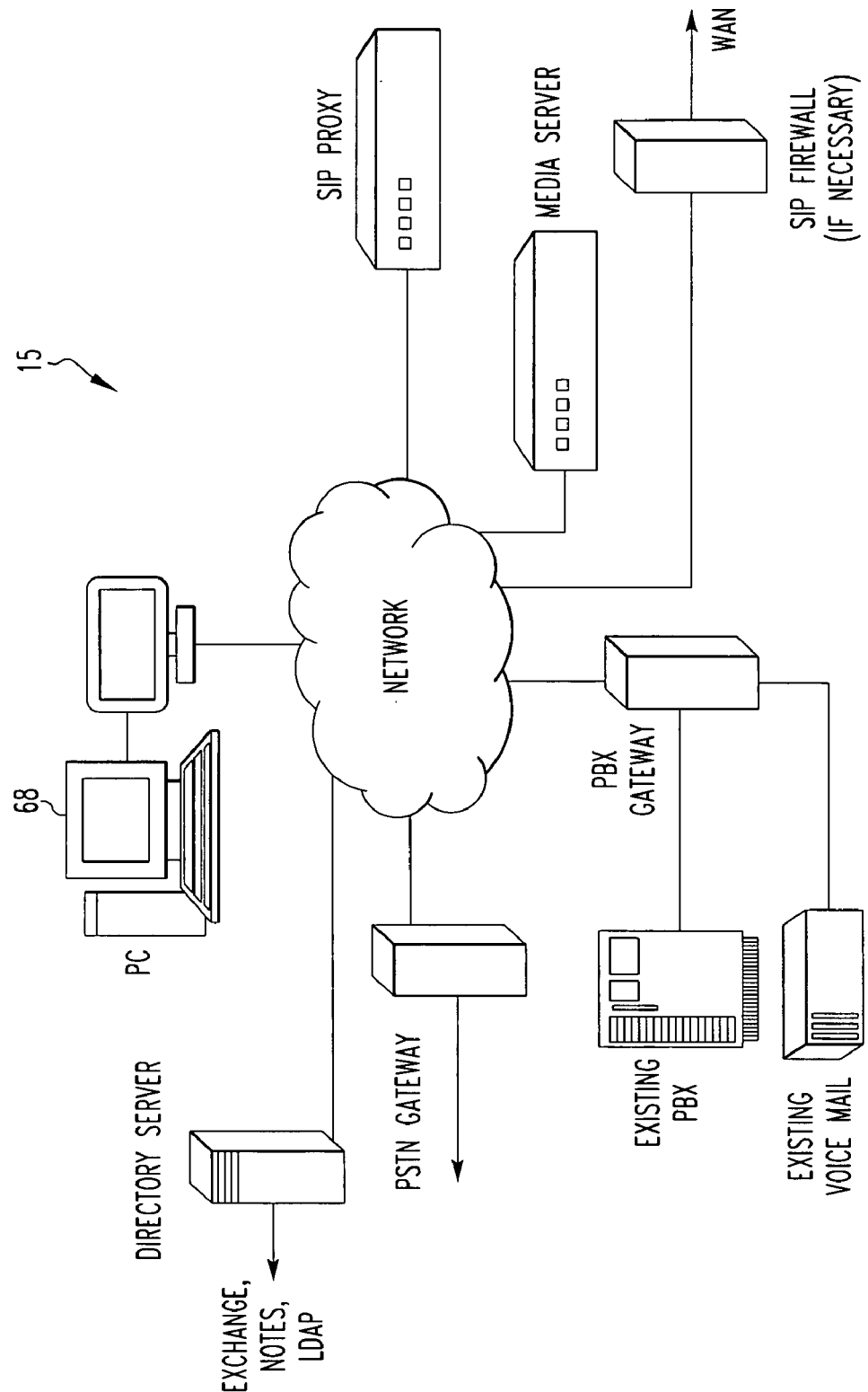
FIG. 10 is a schematic representation of the system.
Figure 11:
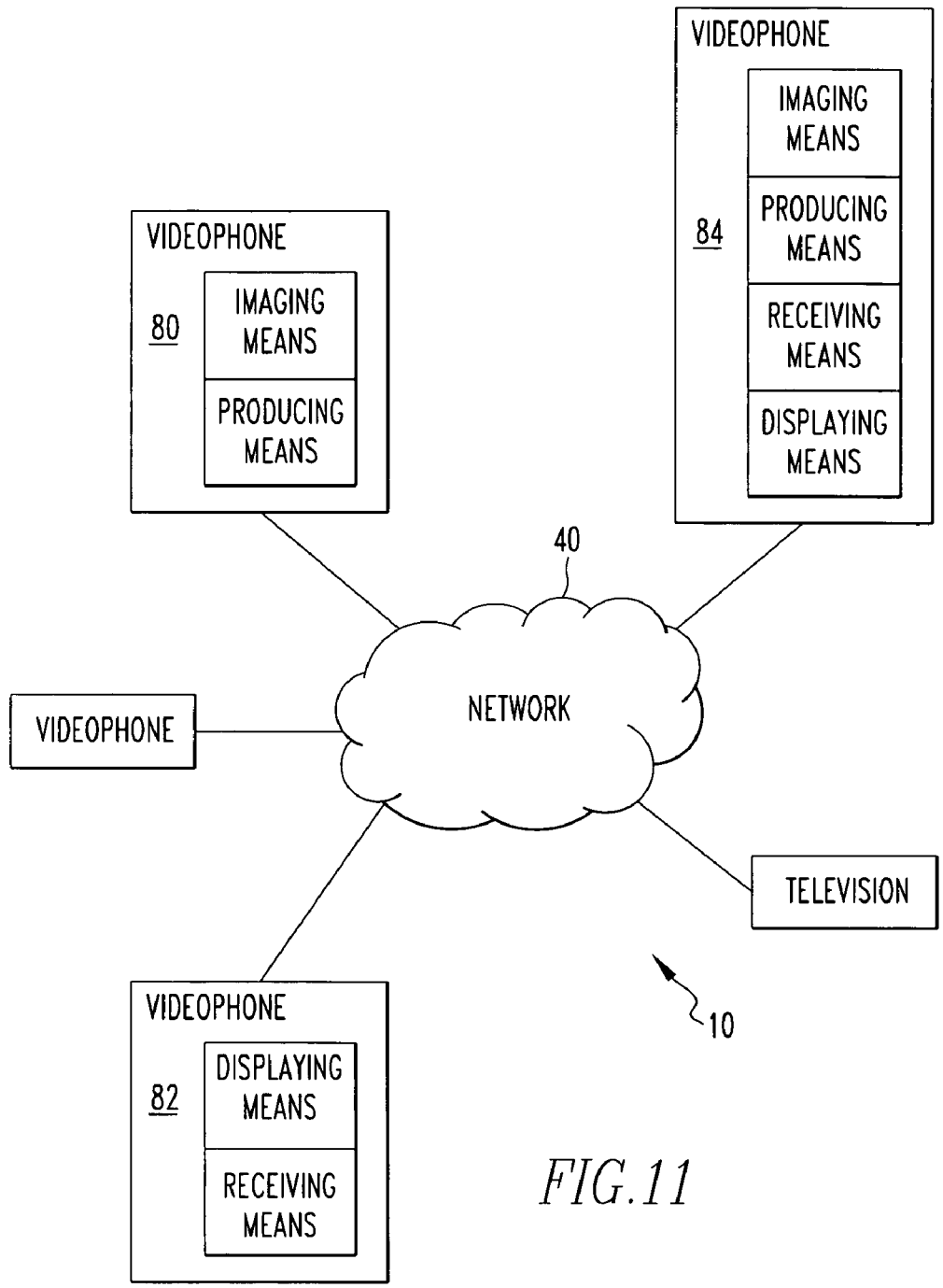
FIG. 11 is a schematic representation of the system.

Referring now to the drawings wherein like reference numerals refer to similar or identical parts throughout the several views, and more specifically to FIGS. 1, 8 and 10 thereof, there is shown a videophone 15. The videophone 15 comprises an imaging means 30 for taking a video picture of a scene. The videophone 15 comprises means for producing a first video stream of the scene and a second video stream of the scene from the video picture and sending the first video stream and the second video stream onto a network 40 at the same time. The producing means is in communication with the imaging means 30. Preferably, the producing means can produce multiple video streams of the scene, with each of the video streams preferably different. Preferably, the producing means includes an encoder 36 and a Field Programmable Gate Array 38 in communication with the imaging means 30, and a network interface 42 in communication with the Field Gate Array 38.

The present invention pertains to a method for making a video call. The method comprises the steps of taking a video picture of a scene. There is the step of producing a first video stream of the scene and a second video stream of the scene from the video picture. There is the step of sending the first video stream and the second video stream onto a network 40 at the same time.

The present invention pertains to a videophone 15. The videophone 15 comprises means for receiving a plurality of video streams of different scenes from a network 40. The videophone 15 comprises means for displaying the different scenes of the plurality of video streams alongside each other. The receiving means is in communication with the displaying means. Preferably, the receiving means includes a network interface 42, and the displaying means includes a display controller 52 in communication with the network interface 42, and a display screen 54 in communication with the display controller 52.

The present invention pertains to a videophone 15. The videophone 15 comprises means for receiving a plurality of video streams of different scenes from a network 40. The videophone 15 comprises means for displaying the different scenes of the plurality of video streams at predetermined areas of various size at the same time. The displaying means is in communication with the receiving means. Preferably, the receiving means includes a network interface 42, and the displaying means includes a display controller 52 in communication with the network interface 42, and a display screen 54 in communication with the display controller 52.

The present invention pertains to a method for a video call. The method comprises the steps of receiving a plurality of video streams of different scenes from a network 40. There is the step of displaying the different scenes of the plurality of video streams at predetermined areas of various size at the same time.

The present invention pertains to a videophone 15. The videophone 15 comprises means for receiving a plurality of video streams of different scenes from a network 40 including at least one video stream of a television channel. The videophone 15 comprises means for displaying at least one of the scenes of the plurality of video streams next to the television channel. The displaying means is in communication with the receiving means. Preferably, the receiving means includes a network interface 42 and a decoder 34. The displaying means preferably includes a display controller 52 in communication with the network interface 42 and the decoder 34, and a display screen 54 in communication with the display controller 52.

The present invention pertains to a method for a video call. The method comprises the steps of receiving a plurality of video streams of different scenes from a network 40 including at least one video stream of a television channel. There is the step of displaying at least one of the scenes of the plurality of video streams next to the television channel.

The present invention pertains to a videophone 15. The videophone 15 comprises imaging means 30 for taking a video picture of a scene. The videophone 15 comprises means for producing a video stream of the scene, and preferably multiple video streams of the scene, from the video picture and sending the video stream or streams of the scene on a network 40 to a plurality of destinations at the same time without using a conferencing bridge or MCU, the producing means in communication with the imaging means 30. Preferably, the producing means includes an encoder 36 and a Field Programmable Gate Array 38 in communication with the imaging means 30, and a network interface 42 in communication with the Field Programmable Gate Array 38.

The present invention pertains to a method for a video call. The method comprises the steps of taking a video picture of a scene. There is the step of producing a video stream of the scene from the video picture. There is the step of sending the video stream of the scene on a network 40 to a plurality of destinations at the same time without using a conferencing bridge or MCU.

The present invention pertains to a videophone 15. The videophone 15 comprises an imaging means 30 for taking a video picture of a scene. The videophone 15 comprises means for producing a video stream of the scene from the video picture using continuous P and sending the video stream onto a network 40, the producing means in communication with the imaging means 30. Preferably, the producing means includes an encoder 36 and a Field Programmable Gate Array 38 in communication with the imaging means 30, and a network interface 42 in communication with the Field Programmable Gate Array 38.

The present invention pertains to a method for a video call. The method comprises the steps of taking a video picture of a scene. There is the step of producing a video stream of the scene from the video picture using continuous P and sending the video stream onto a network 40.

The present invention pertains to a videophone 15. The videophone 15 comprises an imaging means 30 for taking a video picture of a scene. The videophone 15 comprises means for producing a video stream of the scene from the video picture, clipping areas of the scene where there is no user of the videophone 15 and sending the video stream onto a network 40. The producing means is in communication with the imaging means 30. Preferably, the producing means includes a main controller 50, and an encoder 36 and a Field Programmable Gate Array 38 and communication with the imaging means 30 and the main controller 50, and a network interface 42 in communication with the Field Programmable Gate Array 38.

The present invention pertains to a method for a video call. The method comprises the steps of taking a video picture of a scene. There is the step of producing a video stream of the scene from the video picture. There is the step of clipping areas of the scene where there is no user of the videophone 15. There is the step of sending the video stream onto a network 40.

The present invention pertains to a videophone 15. The videophone 15 comprises an imaging means 30 for taking a video picture of a scene. The videophone 15 comprises means for producing a video stream of the scene from the video picture and an audio stream of the scene, and sending the video stream onto a network 40 and the audio stream, only if there is noise above a predetermined threshold at the scene, onto the network 40. The producing means is in communication with the imaging means 30. Preferably, the producing means includes a main controller 50, an encoder 36 and a Field Programmable Gate Array 38 and communication with the imaging means 30 and the main controller 50, a DSP 62 in communication with the Field Programmable Gate Array 38 and the main controller 50, and a network interface 42 in communication with the Field Programmable Gate Array 38.

The present invention pertains to a method for a video call. The method comprises the steps of taking a video picture of a scene. There is the step of producing a video stream of the scene from the video picture and an audio stream of the scene. There is the step of sending the video stream onto a network 40 and the audio stream, only if there is noise above a predetermined threshold at the scene, onto the network 40.

The present invention pertains to a videophone 15. The videophone 15 comprises an imaging means 30 for taking a video picture of a scene. The videophone 15 comprises means for producing a video stream of the scene from the video picture and sending the video stream onto a network 40 without frame buffering of the video stream except for packetization purposes. The producing means in communication with the imaging means 30. Preferably, the producing means includes an encoder 36 and a Field Programmable Gate Array 38 in communication with the imaging means 30, and a network interface 42 in communication with the Field Gate Array 38.

The present invention pertains to a method for a video call. The method comprises the steps of taking a video picture of a scene. There is the step of producing a video stream of the scene from the video picture and sending the video stream onto a network 40 without frame buffering of the video stream except for packetization purposes.

The present invention pertains to a presence sensor 76 for a network 40, as shown in FIG. 12. The presence sensor 76 comprises means for producing a presence indicator of whether a person is in the scene. The presence sensor 76 comprises means for sending the presence indicator to the network 40. The sending means is in communication with the producing means. Preferably, the sensor 76 includes means for alerting the person in the scene that the presence indicator is going to be produced in a predetermined time. Preferably, the indicator producing means includes an imaging means 30, and the sending means includes a Field Programmable Gate Array 38 in communication with the imaging means 30, and a network interface 42 in communication with the Field Programmable Gate Array 38.

The present invention pertains to a method for sensing presence for a network 40. The method comprises the steps of producing a presence indicator of whether a person is in a scene. There is the step of sending the presence indicator to the network 40. Preferably, there is the step of alerting the person in the scene that the presence indicator is going to be produced in a predetermined time.

Figure 13:
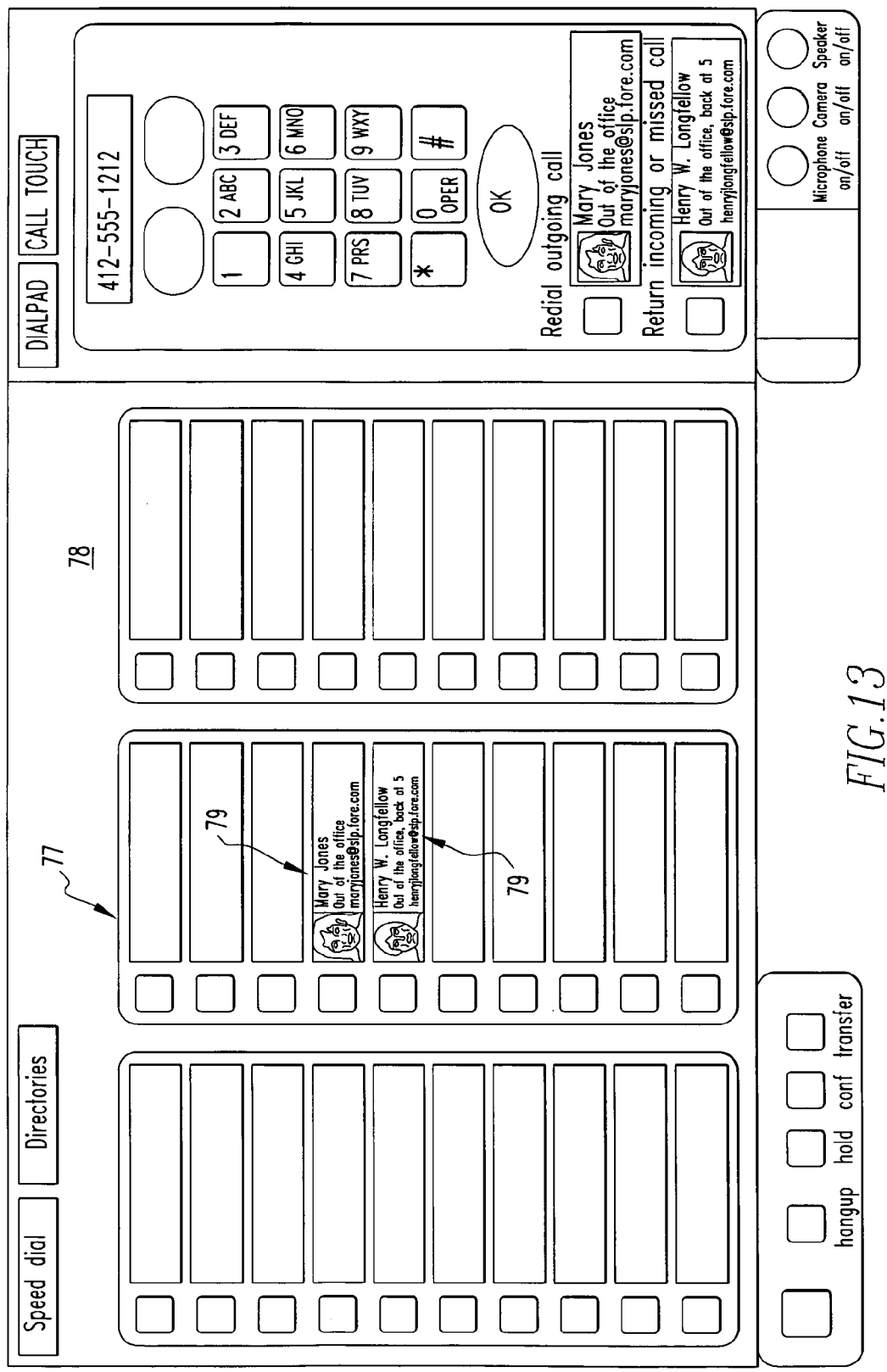
FIG. 13 is a page of a touch screen of the videophone.

The present invention pertains to a page 78 for a touch screen to make a video call, as shown in FIG. 13. The page 78 comprises a list 77 of phone numbers for videophones. The page 78 comprises a designator associated with each phone number which when touched, places a video call to the phone number associated with the designator. Preferably, the page 78 includes a presence indicator 79 associated with each phone number identifying whether a person is present at the associated videophone 15 of the phone number. The presence indicator 79 can be a picture of the scene about the respective videophone 15.

The present invention pertains to a method for making a video call. The method comprises the steps of touching a button on a page of a touch screen associated with a phone number of a videophone 15. There is the step of placing the video call to the videophone 15 at the phone number associated with the button. Preferably, there is the step of displaying a presence indicator associated with each phone number of the videophone 15 identifying whether a person is present at the associated videophone 15 of the phone number.

The present invention pertains to a method for communicating with a person. The method comprises the steps of calling a phone number for a videophone 15 of the person. There is the step of leaving a video message with the videophone 15 when prompted by the videophone 15.

The present invention pertains to a videophone 15. The videophone 15 comprises means for prompting a video caller to leave a video message. The videophone 15 comprises means for saving the video message until it is desired to be seen. The prompting means preferably includes a server 66 in communication with the videophone, and the saving means preferably includes a video message memory in communication with the server 66.

The present invention pertains to a videophone 15. The videophone 15 comprises means for producing a video stream of a scene having a resolution of at least 640×480 and preferably at least 720×480 pixels, a delay of less than 100 ms and a frame rate of at least 25 frames per second. The videophone 15 comprises means for producing an audio stream of the scene that is full duplex and is subject to stereo echo cancellation. Preferably, the video stream producing means includes an imaging means 30, an encoder 36 and a Field Programmable Gate Array 38 in communication with the imaging means 30, and a network interface 42 in communication with the Field Programmable Gate Array 38. The audio stream producing means preferably includes microphone means, an audio interface in communication with the microphone means and a DSP 62 in communication with the audio interface and the network interface 42.

The present invention pertains to a method for communicating with a person. The method comprises the steps of producing a video stream of a scene having a resolution of at least 640×480 and preferably at least 720×480 pixels, a delay of less than 100 ms and a frame rate of at least 25 frames per second, and preferably a bit rate of greater than or equal to 1.5 Mbits/sec There is the step of producing an audio stream of the scene that is full duplex and is subject to stereo echo cancellation. There is the step of sending the video stream and audio stream to a videophone 15 of the person.

The present invention pertains to a videophone 15. The videophone 15 comprises a display screen 54 for displaying a video stream received from a network 40. The videophone 15 comprises microphone means for receiving sound from a scene. The videophone 15 comprises speaker means for playing an audio stream received from the network 40 into the scene. The videophone 15 comprises means for monitoring noise produced by the speaker means into the scene and adjusting the speaker means to maintain a desired level of noise produced by the speaker means. The monitoring means in communication with the speaker means and the microphone means. The microphone means preferably includes a microphone array. The speaker means preferably includes speakers. The monitoring means preferably includes a DSP 62 and a main controller 50 in communication with the DSP 62.

The present invention pertains to a method for operating a videophone 15. The method comprises the steps of displaying a video stream received from a network 40 on a display screen 54. There is the step of receiving sound from a scene by microphone means. There is the step of playing an audio stream received from the network 40 with speaker means into the scene. There is the step of monitoring noise produced by the speaker means into the scene and adjusting the speaker means to maintain a desired level of noise produced by the speaker means.

The present invention pertains to a videophone 15. The videophone 15 comprises means for recognizing a spoken command to make a video call to a destination. The videophone 15 comprises means for making the video call and using the spoken command to announce the video call at the destination. Preferably, the recognizing means includes microphone means, a DSP 62 in communication with the microphone means, and a main controller 50 in communication with the DSP 62. The making means preferably includes the main controller 50 and the DSP 62, a Field Programmable Gate Array 38 in communication with the DSP 62 and the main controller 50, and a network interface 42 in communication with the Field Programmable Gate Array 38.

The present invention pertains to a method for making a video call. The method comprises the steps of recognizing a spoken command to make a video call to a destination by a videophone 15. There is the step of making the video call with the videophone 15 and using the spoken command to announce the video call at the destination.

The present invention pertains to a videophone 15. The videophone 15 comprises a plurality of individual display screens 54. The videophone 15 comprises means for displaying different scenes of a plurality of video streams received from a network 40 at the same time on the plurality of screens as though the plurality screens is one continuous screen. The displaying means is in communication with the plurality of display screens 54. Preferably, the displaying means includes a main controller 50, a display controller 52 in communication with the main controller 50 and the plurality of individual display screens 54, and a network interface 42 in communication with the display controller 52.

The present invention pertains to a method for having a video call. The method comprises the steps of receiving a plurality of video streams of different scenes. There is the step of displaying the different scenes of the plurality of video streams on a plurality of display screens 54 at the same time that are connected together as though the plurality of screens is one continuous screen.

The present invention pertains to a videophone 15. The videophone 15 comprises a first imaging means 30 for taking a video picture of a scene. The videophone 15 comprises second imaging means 30 for taking a different video picture of the scene than the first imaging means 30. The videophone 15 comprises means for producing a video stream of the scene from either the video picture taken by the first imaging means 30 or the second imaging means 30 and sending the video stream onto a network 40. The producing means is in communication with the first imaging means 30 or second imaging means 30. Preferably, the producing means includes a main controller 50, an encoder 36 and a Field Programmable Gate Array 38 in communication with the first imaging means 30 and the second imaging means 30 and the main controller 50, and a network interface 42 in communication with the Field Programmable Gate Array 38.

The present invention pertains to a method for a video call. The method comprises the steps of taking a video picture of a scene with a first imaging means 30. There is the step of taking a video picture of the scene with a second imaging means 30. There is the step of producing a video stream of the scene from the video picture of either the first imaging means 30 or the second imaging means 30 and sending the video stream onto a network 40.

The present invention pertains to an apparatus 80 for conferencing, as shown in FIG. 14. The apparatus comprises means for receiving from a network 40 N audio streams associated with noise from different locations, where N is an integer greater than or equal to 3. The apparatus comprises means for choosing M of the audio streams from the N audio streams, where M is an integer less than or equal to N. The apparatus comprises means for mixing and playing the M audio streams.

Preferably, the receiving means receives P video streams associated with pictures from the different locations, where P is greater than or equal to 3 and is an integer, and the choosing means chooses S of the video streams, where S is an integer less than P from the P video streams; and including means for playing the S video streams. The apparatus preferably includes means for sending a local audio stream to the network 40 if the local audio stream has noise above a threshold. Preferably, the threshold is dynamic, and including means for determining the threshold based on noise level of the M audio streams chosen by the choosing means. The determining means preferably determines the threshold based on thresholds received from M of the different locations associated with the M audio streams. Preferably, the sending means includes a network interface 42, a Field Programmable Gate Array 38 in communication with the network interface 42, and a DSP 62 in communication with the Field Programmable Gate Array 38. The determining means preferably includes the DSP 62. The receiving means preferably includes the network interface 42, the Field Programmable Gate Array 38 in communication with the network interface 42, and the DSP 62 in communication with the Field Programmable Gate Array 38. The choosing means and the mixing means preferably includes the DSP 62.

The present invention pertains to a system for conferencing. The system comprises a network 40. The system comprises N nodes connected to each other through the network 40, where N is greater than or equal to 3 and is an integer. Each node sends an audio stream to the network 40 if there is noise above a threshold at the respective node. Each node plays M of the audio streams from the N nodes, where M is less than N and is an integer. Each node determines its respective threshold at a given time based on noise level of the M audio streams played at the given time at the node. The threshold is dynamic, and is determined independent and distributed among the N nodes, with each node not necessarily playing the M audio streams that any other node is playing.

The present invention pertains to a method for conferencing. The method comprises the steps of receiving from a network 40 N audio streams associated with noise from different locations, where N is an integer greater than or equal to 3. There is the step of choosing M of the audio streams from the N audio streams, where M is an integer less than or equal to N 3. There is the step of mixing and playing the M audio streams.

The present invention pertains to an apparatus for conferencing. The apparatus comprises means for sending an audio stream to a network 40 if the audio stream has noise above a threshold at a given time. The apparatus comprises means for dynamically determining the threshold as a function of noise of a plurality of received audio streams from the network 40 at the given time. Preferably, the sending means includes a network interface 42, a Field Programmable Gate Array 38 in communication with the network interface 42, and a DSP 62 in communication with the Field Programmable Gate Array 38. The determining means preferably includes the DSP 62.

The present invention pertains to a method for conferencing. The method comprises the steps of determining dynamically a threshold for sending an audio stream to a network 40 as a function of noise of a plurality of received audio streams from the network 40. There is the step of sending the audio stream to the network 40 if the audio stream has noise above the threshold.

The present invention pertains to a telecommunications system 10. The system 10 comprises a network 40. The system 10 comprises a first node 80, a second node 82, and at least a third node 84 in communication with each other through the network 40. The first node 80 sends a first video stream of a scene at the first node 80, a second video stream of the scene at the first node 80 and an audio stream of the scene at the first node 80 to the second and third nodes 84. The second and third nodes 84 playing the audio stream and either the first video stream or the second video stream.

Preferably, the first video stream has a frame rate greater than 25 frames per second and the second video stream has a frame rate less than 25 frames per second. Preferably, the first video stream has a bit rate greater than or equal to 1.5 Mbits per second and the second video stream has a bit rate less than 1.5 Mbits per second. The second and third nodes 84 preferably have a display screen and when the second or third nodes 84 display the first video stream, they display the first video stream as a large image across an area of greater than or equal to 20% of the screen, and when the second and third nodes 84 display the second video stream, they display the second video stream as a small image across an area of less than 20% of the screen. Preferably, the system 10 includes a fourth node in communication with the first, second and third nodes 84 through the network 40, which sends a television video stream of a television channel to the first, second and third nodes 84. The first, second and third nodes 84 are able to display the television video stream on the screen alongside the first video stream.

The second node 82 preferably sends a first video stream of a scene at the second node 82, a second video stream of the scene at the second node 82 and an audio stream of the scene to the third node 84; and wherein the third node 84 has a display controller 52 which controls the image that appears on the screen and which plays each first video stream from each node alongside each other on the screen of a third node 84. Preferably, the network 40 is an Ethernet or ATM network 40. The first and second video streams and the audio streams of the first and second nodes 82 are preferably sent over the network 40 for a video conference call, with no conferencing bridge or MCU used for the video conference call. Preferably, each node uses ATM point to multipoint streams for the video conference call.

The third node 84 preferably predetermines which of the first or second video streams from the first or second nodes 82 to display. Preferably, the third node 84 chooses to display the first video stream from the first or second nodes 82 if a user in the respective scene at the first or second nodes 82 is talking, or the third node 84 has predetermined to display the first video stream of the first or second nodes 82. The first video stream of the first and second nodes 82 is preferably in a desired format, such as MPEG-2 format, when it is sent over the network 40. Preferably, the first and second nodes 82 use continuous P to place the first video stream of the first and second nodes 82 in the MPEG-2 format. The first and second nodes 82 preferably clip the first video streams of the scene of the first and second nodes 82, respectively.

Preferably, the first and second nodes 82 clip the first video stream of their respective scenes by removing a portion of the first video stream that is associated with a location of the respective scene that has no user. The first and second nodes 82 preferably only send an audio stream of the scene of the first and second nodes 82, respectively, if there is a noise above a predetermined threshold at the respective scene. Preferably, the first node 80 has an automatic presence sensor which determines whether a user is present at the scene at the first node 80, and produces a presence indicator of whether the user is at the first node 80, the first node 80 sends the presence indicator to the second and third nodes 84. The first node 80 preferably produces an-alert signal to alert any user in the scene at the first node 80 that the presence indicator is going to be formed in a predetermined time.

Preferably, the first node 80 includes an imaging means for taking a video picture of the first scene and producing the first video stream. The system 10 preferably includes an encoder 36 in communication with the imaging means which compresses and encodes the first video stream into MPEG-2 format without frame buffering. Preferably, the first node 80 includes a Field Programmable Gate Array 38 in communication with the encoder 36, which packetizes the first video stream, and also receives the first video stream from the imaging means and produces the second video stream of the first node 80 and packetizes the second video stream. The first node 80 preferably includes a network interface 42 in communication with the Field Programmable Gate Array 38 and the network 40 and transfers the first video stream of the first node 80 to the network 40, and receives the first video stream from the second node 82 and sends it to the Field Programmable Gate Array 38.

Preferably, the first node 80 includes microphone means for receiving sound from the first scene and producing the audio stream of the first node 80. The first node 80 preferably includes speaker means in communication with the network interface 42 for playing the audio stream from the second node 82. Preferably, the first node 80 includes a DSP 62 which packetizes the audio stream of the first node 80 and provides the audio stream to the Field Programmable Gate Array 38 which transfers the audio stream of the first node 80 to the network interface 42 which transfers the audio stream of the first node 80 to the network 40, and receives the audio stream of the second node 82 from the Field Programmable Gate Array 38. The first node 80 preferably includes an audio interface 60 which receives the audio stream of the first node 80 from the microphone means and digitizes it and provides it to the DSP 62, and converts the audio stream from the second node 82 that it receives from the DSP 62 to an analog form for the speaker means to play.

Preferably, the network interface 42 time stamps packets of the audio stream and the video stream of the first node 80 before they are sent to the network 40, and aligns the packets of the video stream and audio stream of the second node 82 that the first node 80 receives by time stamp so when the video stream and audio stream of the second node 82 are played by the first node 80, the associated sound with the image of the scene of the second node 82 is played. The system 10 preferably includes a receive memory in which the first video stream from the second node 82 is received and stored, and a main controller 50 connected to the network interface 42, the encoder 36, the Field Programmable Gate Array 38 and the DSP 62 to control them, the main controller 50 instructing the network interface 42 to choose the first video stream of the second node 82 and send it to the receive memory, the main controller 50 decodes and expands the first video stream of the second node 82 stored in the receive memory and sends it to the display controller 52.

Preferably, the first node 80 includes an LCD controller connected to the display controller 52, and the display screen includes a panel display connected to the LCD controller, the LCD controller receives the first video stream of the second node 82 from the display controller 52 and prepares the first video stream of the second node 82 for display on the panel. The system 10 preferably includes a touch screen on which buttons associated with functions appear, and a touch screen controller connected to the touch screen and the main controller 50 for transferring information regarding buttons which have been touched on the touch screen by a user to the main controller 50. Preferably, the first node 80 includes a decoder 34 for converting the first video stream from the imaging means of the scene of the first node 80 to digital form and providing it to the encoder 36 and the Field Programmable Gate Array 38, the decoder 34 connected to the Field Programmable Gate Array 38 and the encoder 36, the decoder 34 also receiving the television video stream and other analog form video streams and converting them to digital form.

The camera means preferably includes an analog video camera which is in communication with the decoder 34, a digital video camera which is in communication with the encoder 36 and the Field Programmable Gate Array 38, or a fire wire camera in communication with the Field Programmable Gate Array 38, the Field Programmable Gate Array 38 providing any video stream it receives from the fire wire camera to the encoder 36. Preferably, the DSP 62 provides for stereo echo cancellation of the audio stream of the scene of the first node 80, the encoder 36 provides for the first video stream of the first node 80 to have a resolution of at least 720 by 640 pixels, and the microphone means and the speaker means are full duplex. The DSP 62 preferably monitors the microphone means for the noise level produced by the speaker means and adjusts the speaker means to maintain a desired noise level. Preferably, the main controller 50 recognizes a command by the user to automatically call another user for a video conference, and use the command to announce to the other users that the other user is being requested for the video conference.

The first node 80 preferably has video mail when the first node 80 is not able to accept a video call. Preferably, the system 10 includes a server 66 that is in communication with the network 40 and the first node 80, which receives the video call for the first node 80 when the first node 80 does not receive the video call, stores a video message associated with the video call that the first node 80 does not receive, and sends a video call waiting message to the first node 80 that there is a video message waiting to be shown to the first node 80. The first node 80 preferably has a plurality of display panels connected to the display controller 52, with the images of the first video streams from different nodes being displayed on the panels alongside each other as though the plurality of panels is one continuous panel. Preferably, the first node 80 includes a second imaging means for producing the first video stream of the first node 80 having a different view of the scene at the first node 80 than the imaging means. The main controller 50 preferably sends the second video stream of the first node 80 from the Field Programmable Gate Array 38 to the display controller 52 to be displayed on the panel so the user of the first node 80 can see the scene of the first node 80 on the display panel. Preferably, the first node 80, second node 82 and the third node 84 include a videophone 15. The first node 80, second node 82 and the third node 84 can include a PC 68 in communication with the videophone 15.

The present invention pertains to a telecommunications apparatus 93, as shown in FIG. 17. The apparatus 93 comprises means for communicating with at least a first network 88. The apparatus 93 comprises means for storing an address of a first node 92 from a packet with the address of the first node 92 which was received by the communicating means from the first node 92 through the first network 88, and placing an address of the apparatus 93 with the packet which will be sent from the apparatus 93 by the communicating means. Preferably, the communicating means communicates with the first network 88 and a second network 90 different from the first network 88, and the storing and placing means places the address of the apparatus 93 with the packet relative to the second network 90 onto which the packet will be sent by the communicating means. The communicating means preferably includes a network interface 42, and the storing and placing means includes the network interface 42 and the main controller 50. The apparatus 93 preferably is a videophone or a gateway or a router or switch.

The present invention pertains to a telecommunications system 94, as shown in FIG. 15. The system 94 comprises a first network 88. The system 94 comprises an originating node 86 in communication with the first network 88 which sends a packet having an address of the originating node 86 relative to the first network 88 onto the first network 88. The system 94 comprises a second network 90 different than the first network 88. The system comprises an originating gateway 80 in communication with the first network 88 and the second network 90 having an address relative to the first network 88 and an address relative to the second network 90 which receives the packet from the first network 88, stores the address of the originating node 86, places the address of the originating gateway 80 relative to the second network 90 with the packet and sends the packet to the second network 90. The system 94 comprises a terminating node 84 having an address relative to the second network 90 in communication with the second network 90 which receives the packet, saves the address of the originating gateway 80 relative to the second network 90 and sends a return packet to the originating gateway 80 with the address of the terminating node 84. The originating gateway 80 receives the return packet from the terminating node 84, saves the address of the terminating node 84, places the address of the originating gateway 80 relative to the first network 88 with the return packet and sends the return packet onto the first network 88. The originating node 86 receives the return packet and stores the address of the originating gateway 80 relative to the first address. Preferably, the first network 88 or the second network 90 is either an Ethernet or ATM network, and the originating and terminating nodes are videophones 15.

The present invention pertains to a telecommunications system 95, as shown in FIG. 16. The system 95 comprises a first network 88. The system 95 comprises an originating node 86 in communication with the first network 88 which sends a packet having an address of the originating node 86 relative to the first network 88 onto the first network 88. The system 95 comprises a second network 90 different than the first network 88. The system 95 comprises an originating gateway 80 in communication with the first network 88 and the second network 90 having an address relative to the first network 88 and an address relative to the second network 90 which receives the packet from the first network 88, stores the address of the originating node 86, places the address of the originating gateway 80 relative to the second network 90 with the packet and sends the packet to the second network 90. The system 95 comprises a third network 92 different than the second network 90. The system 95 comprises a terminating gateway 82 in communication with the second network 90 and the third network 92 having an address relative to the third network 92 and an address relative to the second network 90 which receives the packet from the second network 90, stores the address of the originating gateway 80, places the address of the terminating gateway 82 relative to the third network 92 with the packet and sends the packet to the third network 92. The system 95 comprises a terminating node 84 having an address relative to the third network 92 in communication with the third network 92 which receives the packet, saves the address of the terminating gateway 82 relative to the third network 92 and sends a return packet to the terminating gateway 82 with the address of the terminating node 84. The terminating gateway 82 receives the return packet from the terminating node 84, saves the address of the terminating node 84, places the address of the terminating gateway 82 relative to the second network 90 with the return packet and sends the return packet onto the second network 90. The originating gateway 80 receives the return packet from the terminating gateway 82, saves the address of the terminating gateway 82, places the address of the originating gateway 80 relative to the first network 88 with the return packet and sends the return packet onto the first network 88. The originating node 86 receives the return packet and stores the address of the originating gateway 80 relative to the first address. Preferably, the first network 88 and the third network 92 are a same type of network, and the originating and terminating nodes are videophones 15.

The present invention pertains to a method for sending a packet from an originating node 86 to a terminating node 84. The method comprises the steps of sending a packet having an address of the originating node 86 relative to a first network 88 onto the first network 88 from the originating node 86. There is the step of receiving the packet from the first network 88 at an originating gateway 80 in communication with the first network 88 and a second network 90, storing the address of the originating node 86 with the originating gateway 80 having an address relative to the first network 88 and an address relative to the second network 90, placing the address of the originating gateway 80 relative to the second network 90 with the packet, and sending the packet to the second network 90. There is the step of receiving the packet from the second network 90 at the terminating node 84, saving the address of the originating gateway 80 relative to the second network 90, and sending a return packet from the terminating node 84 to the originating gateway 80 with the address of the terminating node 84. There is the step of receiving at the originating gateway 80 the return packet from the terminating node 84, saving the address of the terminating node 84 at the originating gateway 80, placing the address of the originating gateway 80 relative to the first network 88 with the return packet and sending the return packet onto the first by the originating gateway 80. There is the step of receiving the return packet at the originating node 86 and storing the address of the originating gateway 80 relative to the first network 88 at the originating node 86. The originating gateway 80 receives the return packet from the terminating node 84, saves the address of the terminating node 84, places the address of the originating gateway 80 relative to the first network 88 with the return packet and sends the return packet onto the first network 88. The originating node 86 receives the return packet and stores the address of the originating gateway 80 relative to the first address. Preferably, after the receiving the return packet step, there is the step of sending a second packet from the originating node 86 to the terminating node 84 through the originating gateway 80 using the respective address stored in the originating node 86 and the originating gateway 80 for the originating gateway 80 and the terminating node 84, respectively.

Figure 9:
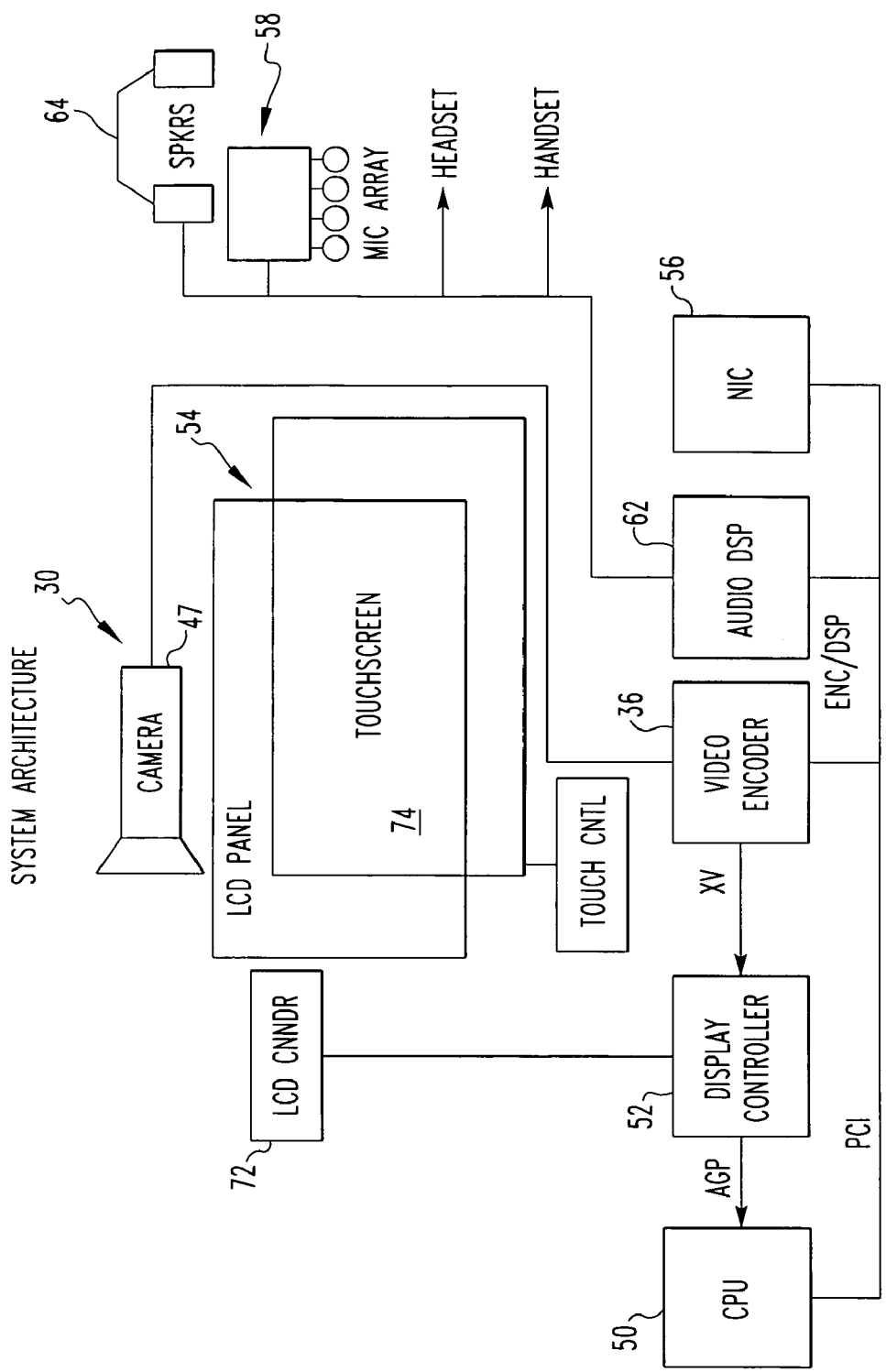
FIG. 9 is a block diagram of the videophone architecture.

In the operation of the preferred embodiment and referring to FIGS. 8, 9 and 10, an imaging device 30, such as a conventional analog camera 32 provided by Sony with S video, converts the images of a scene from the imaging device 30 to electrical signals which are sent along a wire to a video decoder 34, such as a Philips SAA7114 NTSC/PAL/decoder. The video decoder 34 converts the electrical signals to digital signals and sends them out as a stream of pixels of the scene, such as under BT 656 format. The stream of pixels are sent out from the video decoder 34 and split into a first stream and a second stream identical with the first stream. An encoder 36, preferably an IBM eNV 420 encoder, receives the first stream of pixels, operates on the first stream and produces a data stream in MPEG-2 format. The data stream produced by the video encoder 36 is compressed by about 1/50the size as compared to the data as it was produced at the camera. The MPEG-2 stream is an encoded digital stream and is not subject to frame buffering before it is subsequently packetized so as to minimize any delay. The encoded MPEG-2 digital stream is packetized using RTP by a Field Programmable Gate Array (FPGA) 38 and software to which the MPEG-2 stream is provided, and transmitted onto a network 40, such as an Ethernet 802.p or ATM at 155 megabits per second, using a network interface 42 through a PLX 9054 PCI interface 44. If desired, a video stream associated with a VCR or a television show, such as CNN or a movie, can be received by the decoder 34 and provided directly to the display controller 52 for display. A decoder controller 46 located in the FPGA 38 and connected to the decoder 34, controls the operation of the decoder 34.

Alternatively, if a digital camera 47 is used, the resulting stream that is produced by the camera is already in a digital format and does not need to be provided to a decoder 34. The digital stream from the digital camera 47, which is in a BT 656 format, is split into the first and second streams directly from the camera, without passing through any video decoder 34.

In another alternative, a fire wire camera 48, such as a 1394 interface fire wire camera 48, can be used to provide a digital signal directly to the FPGA 38. The fire wire camera 48 provides the advantage that if the production of the data stream is to be at any more than a very short distance from the FPGA 38, then the digital signals can be supported over this longer distance by, for instance, cabling, from the fire wire camera 48. The FPGA 38 provides the digital signal from the fire wire camera 48 to the encoder 36 for processing as described above, and also creates a low fame rate stream, as described below.

The second stream is provided to the FPGA 38 where the FPGA 38 and software produce a low frame rate stream, such as a motion JPEG stream, which requires low bandwidth as compared to the first stream. The FPGA 38 and a main controller 50 with software perform encoding, compression and packetization on this low frame rate stream and provide it to the PCI interface 44, which in turn transfers it to the network interface 42 through a network interface card 56 for transmission onto the network 40. The encoded MPEG-2 digital stream and the low frame rate stream are two essentially identical but independent data streams, except the low frame rate data stream is scaled down compared to the MPEG-2 data stream to provide a smaller view of the same scene relative to the MPEG-2 stream and require less resources of the network 40.

On the network 40, each digital stream is carried to a desired receiver videophone 15, or receiver videophones 15 if a conference of more than two parties is involved. The data is routed using SIP. The network interface card 56 of the receive videophone 15 receives the packets associated with first and second data streams and provides the data from the packets and the video stream (first or second) chosen by the main controller to a receive memory. A main controller 50 of the receive videophone 15 with software decodes and expands the chosen received data stream and transfers it to a display controller 52. The display controller 52 displays the recreated images on a VGA digital flat panel display using standard scaling hardware. The user at the receive videophone 15 can choose which stream of the two data streams to view with a touch screen 74, or if desired, chooses both so both large and small images of the scene are displayed, although the display of both streams from the transmitting videophone 15 would normally not happen. A discussion of the protocols for display is discussed below. By having the option to choose either the larger view of the scene or the smaller view of the scene, the user has the ability to allocate the resources of the system 10 so the individuals at the moment who are more important for the viewer to see in a larger, clearer picture, can be chosen; while those which the user still would like to see, but are not as important at that moment, can still be seen.

The display controller 52 causes each distinct video stream, if there is more than one (if a conference call is occurring) to appear side by side on the display 54. The images that are formed side by side on the display 54 are clipped and not scaled down so the dimensions themselves of the objects in the scene are not changed, just the outer ranges on each side of the scene associated with each data stream are removed. If desired, the images from streams associated with smaller images of scenes can be displayed side by side in the lower right corner of the display 54 screen. The display controller 52 provides standard digital video to the LCD controller 72, as shown in FIG. 9. The display controller 52 produced by ATI or Nvidia, is a standard VGA controller. The LCD controller 72 takes the standardized digital video from the display controller 52 and makes the image proper for the particular panel used, such as a Philips for Fujistu panel.

To further enhance the clipping of the image, instead of simply removing portions of the image starting from the outside edge and moving toward the center, the portion of the image which shows no relevant information is clipped. If the person who is talking appears in the left or right side of the image, then it is desired to clip from the left side in if the person is on the right side of the image, or right side in if the person is on the left side of the image, instead of just clipping from each outside edge in, which could cause a portion of the person to be lost. The use of video tracking looks at the image that is formed and analyzes where changes are occurring in the image to identify where a person is in the image. It is assumed that the person will be moving more relative to the other areas of the image, and by identifying the relative movement, the location of the person in the image can be determined. From this video tracking, the clipping can be caused to occur at the edge or edges where there is the least amount of change. Alternatively, or in combination with video tracking, audio tracking can also be used to guide the clipping of the image which occurs. Since the videophone 15 has microphone arrays, standard triangulation techniques based on the different times it takes for a given sound to reach the different elements of the microphone array are used to determine where the person is located relative to the microphone array, and since the location of a microphone array is known relative to the scene that is being imaged, the location of the person in the image is thus known.

The functionalities of the videophone 15 are controlled with a touch screen 74 on the monitor. The touch screen 74, which is a standard glass touchscreen, provides raw signals to the touch screen controller 76. The raw signals are sensed by the ultrasonic waves that are created on the glass when the user touches the glass at a given location, as is well known in the art. The touch screen controller 76 then takes the raw signals and converts them into meaningful information in regard to an X and Y position on the display and passes this information to the main controller 50.

If a television or VCR connection is available, the feed for the television or movie is provided to the decoder 34 where the feed is controlled as any other video signal received by the videophone 15. The television or movie can appear aside a scene from the video connection with another videophone 15 on the display 54.

The audio stream of the scene essentially follows a parallel and similar path with the audio video stream, except the audio stream is provided from an audio receiver 58, such as a microphone, sound card, headset or hand set to a CS crystal 4201 audio interface 60 or such as a Codec which performs analog to digital and digital analog conversion of the signals, as well as controls volume and mixing, which digitizes the audio signal and provides it to a TCI 320C6711 or 6205 DSP 62. The DSP 62 then packetizes the digitized audio stream and transfers the digitized audio stream to the FPGA 38. The FPGA 38 in turn provides it to the PCI interface 44, where it is then passed on to the network interface card 56 for transmission on the network 40. The audio stream that is received by the receive videophone 15, is passed to the FPGA 38 and on to the DSP 62 and then to the audio interface 60 which converts the digital signal to an analog signal for playback on speakers 64.

The network interface card 56 time stamps each audio packet and video packet that is transmitted to the network 40. The speed at which the audio and video that is received by the videophone 15 is processed is quick enough that the human eye and ear, upon listening to it, cannot discern any misalignment of the audio with the associated in time video of the scene. The constraint of less than 20-30 milliseconds is placed on the processing of the audio and video information of the scene to maintain this association of the video and audio of the scene. To insure that the audio and video of the scene is in synchronization when it is received at a receive videophone 15, the time stamp of each packet is reviewed, and corresponding audio based packets and video based packets are aligned by the receiving videophone 15 and correspondingly played at essentially the same time so there is no misalignment that is discernible to the user at the receiver videophone 15 of the video and audio of the scene.

An ENC-DSP board contains the IBM eNV 420 MPEG-2 encoder and support circuitry, the DSP 62 for audio encoding and decoding, and the PCI interface 44. It contains the hardware that is necessary for full videophone 15 terminal functionality given a high performance PC 68 platform and display 54 system 10. It is a full size PCI 2.2 compliant design. The camera, microphone(s), and speakers 64 interface to this board. The DSP 62 will perform audio encode, decode, mixing, stereo placement, level control, gap filling, packetization, and other audio functions, such as stereo AEC, beam steering, noise cancellation, keyboard click cancellation, or de-reverberation. The FPGA 38 is developed using the Celoxia (Handel-C) tools, and is fully reconfigurable. Layout supports parts in the 1-3 million gate range.

This board includes a digital camera 47 chip interface, hardware or "video DSP" based multi-channel video decoder 34 interface, video overlay using the DVI in and out connectors, up to full dumb frame buffer capability with video overlay.

Using an NTSC or PAL video signal, the encoder 36 should produce a 640×480, and preferably a 720×480 or better resolution, high-quality video stream. Bitrate should be controlled such that the maximum bits per frame is limited in order to prevent transmission delay over the network 40. The decoder 34 must start decoding a slice upon receiving the first macroblock of data. Some buffering may be required to accommodate minor jitter and thus improve picture.

MPEG-2 is widely used and deployed, being the basis for DVD and VCD encoding, digital VCR's and time shift devices such as TiVo, as well as DSS and other digital TV distribution. It is normally considered to be the choice for 4 to 50 Mbit/sec video transmission. Because of its wide use, relatively low cost, highly integrated solutions for decoding, and more recently, encoding, are commercially available now.

MPEG-2 should be thought of as a syntax for encoded video rather than a standard method of compression. While the specification defines the syntax and encoding methods, there is very wide latitude in the use of the methods as long as the defined syntax is followed. For this reason, generalizations about MPEG-2 are frequently misleading or inaccurate. It is necessary to get to lower levels of detail about specific encoding methods and intended application in order to evaluate the performance of MPEG-2 for a specific application.

Of interest to the videophone 15 project are the issues of low delay encode and decode, as well as network 40 related issues. There are three primary issues in the MPEG-2 algorithm that need to be understood to achieve low delay high quality video over a network 40:

The GOP (Group Of Pictures) structure and its effect on delay

The effect of bit rate, encoded frame size variation, and the VBV buffer on delay and network 40 requirements The GOP structure's effect on quality with packet loss The GOP Structure and Delay:

MPEG-2 defines 3 kinds of encoded frames: I, P, and B. The most common GOP structure in use is 16 frames long: IPBBPBBPBBPBBPBB. The problem with this structure is that each consecutive B frame, since a B frame is motion estimated from the previous and following frame, requires that the following frames are captured before encoding of the B frame can begin. As each frame is 33 msec, this adds a minimum of 66 msec additional delay for this GOP structure over one with no B frames. This leads to a low delay GOP structure that contains only I and/or P frames, defined in the MPEG-2 spec as SP@ML (Simple Profile) encoding.

Bit Rate, Encoded Frame Size, and the VBV

Once B frames are eliminated to minimize encoding delay, the GOP is made up of I frames and P frames that are relative to the I frames. Because an I frame is completely intraframe coded, it takes a lot of bits to do this, and fewer bits for the following P frames.

Note that an I frame may be 8 times as large as a P frame, and 5 times the nominal bit rate. This has direct impact on network 40 requirements and delay: if there is a bandwidth limit, the I frame will be buffered at the network 40 restriction, resulting in added delay of multiple frame times to transfer over the restricted segment. This buffer must be matched at the receiver because the play-out rate is set by the video, not the network 40 bandwidth. The sample used for the above data was a low motion office scene; in high motion content with scene changes, frames will be allocated more or less bits depending on content, with some large P frames occurring at scene changes.

To control this behavior, MPEG-2 implements the VBV buffer (Video Buffering Verifier), which allows a degree of control over the ratio between the maximum encoded frame size and the nominal bit rate. By tightly constraining the VBV so that the I frames are limited to less than 2× the size indicated by the nominal bit rate, the added buffering delay can be limited to 1 additional frame time. The cost of constraining the VBV size is picture quality: the reason for large I frames is to provide a good basis for the following P frames, and quality is seriously degraded at lower bit rates (<4 Mbit) when the size of the I frames is constrained. Consider that at 2 Mbit, the average frame size is 8 Kbytes, and even twice this size is not enough to encode a 320×240 JPEG image with good quality, which is DCT compressed similar to an I frame.

Going to I frame only encoding allows a more consistent encoded frame size, but with the further degradation of quality. Low bit rate I frame only encoding does not take advantage of the bulk of the compression capability of the MPEG-2 algorithm.

The MPEG-2 specification defines CBR (Constant Bit Rate) and VBR (Variable Bit Rate) modes, and allows for variable GOP structure within a stream. CBR mode is defined to generate a consistent number of bits for each GOP, using padding as necessary. VBR is intended to allow consistent quality, by allowing variation in encoding bandwidth, permitting the stream to allocate more bits to difficult to encode areas as long as this is compensated for by lower bit rates in simpler sections. VBR can be implemented with two pass or single pass techniques. Variable GOP structure allows, for example, the placement of I frames at scene transition boundaries to eliminate visible compression artifacts. Due to the low delay requirement and the need to look ahead a little bit in order to implement VBR or variable GOP, these modes are of little interest for the videophone 15 application.

Because P and B frames in a typical GOP structure are dependant on the I frame and the preceding P and B frames, data loss affects all of the frames following the error until the next I frame. This also affects startup latency, such as when flipping channels on a DSS system 10, where the decoder 34 waits for an I frame before it can start displaying an image. For this reason, GOP length, structure, and bit rate need to be tuned to the application and delivery system 10. In the case of real time collaboration using IP, an unreliable transport protocol such as RTP or UDP is used because a late packet must be treated as lost, since you can't afford the delay required to deal with reliable protocol handshaking and retransmission. Various analysis has been done on the effect of packet loss on video quality, with results showing that for typical IPB GOP structures, a 1% packet loss results in 30% frame loss. Shorter GOP structures, and ultimately I frame only streams (with loss of quality), help this some, and FEC (Forward Error Correction) techniques can help a little when loss occurs, but certainly one of the problems with MPEG-2 is that it is not very tolerant of data loss.

A GOP structure called Continuous P frame encoding addresses all of the aforementioned issues and provides excellent video quality at relatively low bit rates for the videophone 15. Continuous P encoding makes use of the ability to intra-frame encode macro-blocks of a frame within a P frame. By encoding a pseudo-random set of 16×16 pixel macro-blocks in each frame, and motion-coding the others, the equivalent of I-frame bits are distributed in each frame. By implementing the pseudo-random macro-block selection to ensure that all blocks are updated on a frequent time scale, startup and scene change are handled in a reasonable manner.

IBM has implemented this algorithm for the S420 encoder, setting the full frame DCT update rate to 8 frames (3.75 times per second). The results for typical office and conference content is quite impressive. The encoding delay, encoded frame size variation, and packet loss behavior is nearly ideal for the videophone 15. Review of the encoded samples shows that for scene changes and highly dynamic content that encoder 36 artifacts are apparent, but for the typical talking heads content of collaboration, the quality is very good.

High-quality audio is essential prerequisite for effective communications. High-quality is defined as full-duplex, a 7 kHz bandwidth, (telephone is 3.2 kHz), >30 dB signal-to-noise ratio, no perceivable echo, clipping or distortion. Installation will be very simple involving as few cables as possible. On board diagnostics will indicate the problem and how to fix it. Sound from the speakers 64 will be free of loud pops and booms and sound levels either too high or too low.

An audio signal from missing or late packets can be "filled" in based on the preceding audio signal. The audio buffer should be about 50 ms as a balance between network 40 jitter and adding delay to the audio. The current packet size of 320 samples or 20 ms could be decreased to decrease the encode and decode latency. However, 20 ms is a standard data length for RTP packets.

Some of the processes described below are available in commercial products. However, for cost and integration reasons, they will be implemented on a DSP 62. In another embodiment, a second DSP 62 can perform acoustic echo cancellation instead of just one DSP 62 performing this function also.

The audio system 10 has a transmit and a receive section. The transmit section is comprised of the following:

Microphones

One of the principal complaints of the speaker phone is the hollow sound that is heard at the remote end. This hollow sound is due to the room reverberation and is best thought of as the ratio of the reflected (reverberant) sound power over the direct sound power. Presently, the best method to improve pickup is to locate microphones close to the talker and thus increase the direct sound power. In an office environment, microphones could be located at the PC 68 monitor, on the videophone 15 terminal and at a white board.

Automatic Gain Control

The gain for the preamplifier for each microphone is adjusted automatically such that the ADC range is fully used. The preamp gain will have to be sent to other audio processes such as AEC and noise reduction.

CODEC

In its simplest form, this is an ADC device. However, several companies such as Texas Instruments and Analog Devices Inc have CODECS with analog amplifiers and analog multiplexers. Also, resident on the chip is a DAC with similar controls. The automatic gain control described in the previous section is implemented in the CODEC and controlled by the DSP 62.

Noise Reduction

Two methods of noise reduction can be used to improve the SNR. The first method is commonly called noise gating that turns on and off the channel depending on the level of signal present. The second method is adaptive noise cancellation (ANC) and subtracts out unwanted noise from the microphone signal. In office environment, it would be possible use ANC to remove PA announcements, fan noise and in some cases, even keyboard clicks.

Noise reduction or gating algorithms are available in commercial audio editing packages such as Cool Edit and Goldwave that can apply special effects, remove scratch and pop noise from records and also remove hiss from tape recordings.

Acoustic Echo Cancellation

Echo is heard when the talker's voice returns to the talker after more than 50 ms. The echo is very distracting and thus needs to be removed. The two sources of echo are line echo and acoustic echo. The line echo is due to characteristics of a two-line telephone system 10. The PSTN removes this echo using a line echo canceller (LEC). When using a speaker phone system 10, acoustic echo occurs between the telephone speaker and the microphone. The sound from the remote speaker is picked by the remote microphone and returned to talker. Acoustic echo cancellation (AEC) is more difficult than LEC since the room acoustics are more complicated to model and can change suddenly with movement of people. There are many AEC products ranging from the stand-alone devices such as ASPI EF1210 to Signal Works object modules optimized to run on DSP 62 platforms.

Automixing

Automixing is selecting which microphone signals to mix together and send the monaural output of the mixer to the encoder 36. The selection criteria is based on using the microphone near the loudest source or using microphones that are receiving sound that is above a threshold level. Automixers are commercially available from various vendors and are used in teleconferencing and tele-education systems.

Encoding

To reduce data transmission bandwidth, the audio signal is compressed to a lower bit rate by taking advantage of the typical signal characteristics and our perception of speech. Presently, the G.722 codec offers the best audio quality (7 kHz bandwidth @ 14 bits) at a reasonable bit rate of 64 kbits/sec.

RTP Transmission

The encoded audio data is segmented into 20 msec segments and sent as RealTime Protocol (RTP) packets. RTP was specifically designed for realtime data exchange required for VoIP and teleconference applications.

The receive section is:

RTP Reception

RTP packets containing audio streams from one or more remote locations are placed in their respective buffers. Missing or late packets are detected and that information is passed to the Gap Handler. Out of order packets are a special case of late packets and like late packets are likely to be discarded. The alternative is to have a buffer to delay playing out the audio signal for at least one packet length. The size of the buffer will have to be constrained such that the end-to-end delay is no longer than 100 ms.

Decoding

The G.722 audio stream is decoded to PCM samples for the CODEC.

Gap Handling

Over any network, RTP packets will be lost or corrupted. Therefore, the Gap Handler will "fill in" the missing data based on the spectrum and statistics of the previous packets. As a minimum, zeros should be padded in the data stream to make up data but a spectral interpolation or extrapolation algorithm to fill in the data can be used.

Buffering

Network jitter will require buffering to allow a continuous audio playback. This buffer will likely adjust its size (and hence latency) based on a compromise between the short-term jitter statistics and the effect of latency.

Rate Control

The nominal sample rate for a videophone 15 terminal is 16 kHz. However, slight differences will exist and need to be handled. For example, suppose that videophone 15 North samples at precisely 16,001 Hz while videophone 15 South samples at 15,999 Hz. Thus, the South terminal will accumulate 1 more samples per second than it outputs to the speaker and the North terminal will run a deficit of equal amount. Long-term statistics on the receiving buffer will be able to determine what the sample rate differential is and the appropriate interpolation (for videophone 15 North) or decimation (for videophone 15 South) factor can be computed.

Volume Control

Adjusting the volume coming from the speakers 64 is typically done by the remote listeners. A better way might be to automatically adjust the sound from the speakers 64 based on how loud it sounds to the microphones in the room. Other factors such as the background noise and the listener's own preference can be taken into account.

Stereo Placement

Remote talkers from different locations can be placed in the auditory field. Thus, a person from location A would consistently come from the left, the person from location B from the middle and the person from location C from the right. This placement makes it easier to keep track of who is talking.

Speakers

The quality of the sound to some extent is determined by the quality of the speakers 64 and the enclosure. In any case, self-amplified speakers 64 are used for the videophone 15 terminal.

Differentiation

Present conferencing systems such as the PolyCom Soundstation offer satisfactory but bandlimited full-duplex audio quality. However, the bandwidth is limited to 3500 Hz and the resulting sound quality strains the ear and especially in distinguishing fricative sounds.

Videophone 15 extends the bandwidth to 7 kHz and automixes multiple microphones to minimize room reverberation. When three or more people are talking, each of the remote participants will be placed in a unique location in the stereo sound field. Combined with the high-quality audio pick-up and increased bandwidth, a conference over the network 40 will quickly approach that of being there in person.

The audio system 10 uses multiple microphones for better sound pick-up and a wideband encoder (G.722) for better fidelity than is currently offered by tollgrade systems. Additionally, for multiple party conferences, stereo placement of remote talkers will be implemented and an acoustic echo cancellation system 10 to allow hands free operation. Adjustment of volume in the room will be controlled automatically with a single control for the end user to adjust the overall sound level.

In the videophone 15 network 40, a gateway 70 connects something non-SIP to the SIP environment. Often there are electrical as well as protocol differences. Most of the gateways 70 connect other telephone or video conference devices to the videophone 15 system 10.

Gateways 70 are distinguished by interfaces; one side is a network 40, for videophone 15 this is Ethernet or ATM. The external side may be an analog telephone line or RS-232 port. The type, number and characteristics of the ports distinguishes one gateway 70 from another. On the network 40 side, there are transport protocols such as RTP or AAL2, and signaling protocols such as SIP, Megaco or MGCP.

On the external side, there may be a wide variety of protocols depending on the interfaces provided. Some examples would be ISDN (Q.931) or POTS signaling. PSTN gateways 70 connect PSTN lines into the videophone 15 system 10 on site. PBX gateways 70 allow a videophone 15 system 10 to emulate a proprietary telephone to provide compatibility to existing on-site PBX. POTS gateways 70 connect dumb analog phones to a videophone 15 system 10. H.323 gateways 70 connect an H.323 system 10 to the SIP based videophone 15 system 10. This is a signaling-only gateway 70—the media server 66 does the H.261 to MPEG conversion.

Three enabling technologies for the videophone 15 are the Session Initiation Protocol (SIP), the Session Description Protocol (SDP) and the Real-time Transport Protocol (RTP), all of which are incorporated by reference herein.

SIP is a signaling protocol for initiating, managing and termination voice and video sessions across packet networks.

SDP is intended for describing multimedia sessions for the purposes of session announcement, session invitation, and other forms of multimedia session initiation. SIP uses SDP to describe media sessions.

RTP provides end-to-end network 40 transport functions suitable for applications transmitting real-time data, such as audio, video or simulation data, over multicast or unicast network 40 services. SIP uses RTP for media session transport.

The videophone 15 can perform conferences with three or more parties without the use of any conferencing bridge or MCU. This is accomplished by using ATM point to multipoint streams as established by SIP. More specifically, when the MPEG-2 stream and the low frame rate stream is packetized for transmission onto the network 40, the header information for each of the packets identifies the addresses of all the receive videophones 15 of the conference, as is well known in the art. From this information, when the packets are transmitted to the network 40, SIP establishes the necessary connectivity for the different packets to reach their desired videophone 15 destinations.

As an example of a conference that does not use any conferencing bridge, let there be 10 videophones 15 at discreet locations who are parties to a conference. Each videophone 15 produces an audio based stream, and an MPEG-2 based stream and a low frame rate based stream. However, each videophone 15 will not send any of these streams back to itself, so effectively, in a 10 party conference of videophones 15, each communicate with the nine other videophones 15. While it could be the case that the videophone 15 communicates with itself, to maximize the bandwidth utilization, the video produced by any videophone 15 and, if desired, the audio produced by a videophone 15 can be shown or heard as it essentially appears to the other videophones 15, but through an internal channel, which will be described below, that does not require any bandwidth utilization of the network 40.

In the conference, each videophone 15 receives nine audio based streams of data. Three MPEG-2 based streams of data and six low frame rate based streams of data. If desired, the receiver could choose up to nine streams of low frame rate based streams so the display 54 only shows the smaller images of each videophone 15, or up to four of the MPEG-2 based streams of data where the display 54 is filled with four images from four of the videophones 15 of the conference with no low frame rate based streams having their image shown, since there is no room on the display 54 for them if four MPEG-2 based streams are displayed. By having three MPEG-2 based streams shown, this allows for six of the low frame rate based streams to be shown. Each of the streams are formed as explained above, and received as explained above at the various videophones 15.

Figure 7:
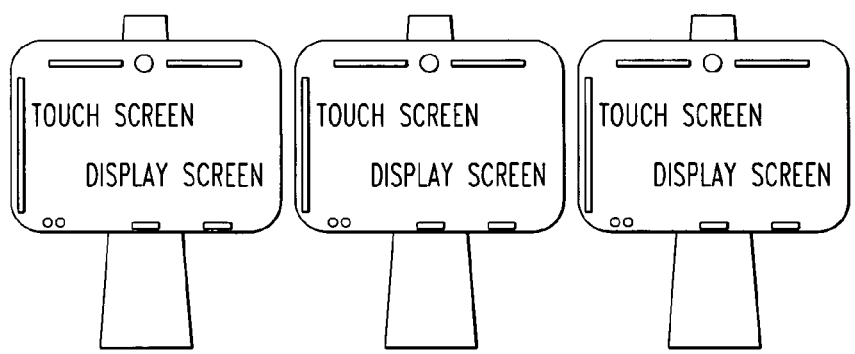
FIG. 7 is a schematic representation of a multi-screen configuration for the videophone.

If more than four large images are desired to be shown of a conference, then the way that this is accomplished is additional videophones 15 are connected together so that the displays of the different videophones 15 are lined up side by side, as shown in FIG. 7. One videophone 15 can be the master, and as each additional videophone is added, it becomes a slave to the master videophone 15, which controls the display 54 of the large and small images across the different videophones 15.

In terms of the protocols to determine who is shown as a large image and who is shown as a small image on the displays of the videophones 15 of the conference, one preferred protocol is that the three most recent talkers are displayed as large, and the other parties are shown as small. That is, the party who is currently talking and the two previous talkers are shown as large. Since each videophone 15 of the conference receives all the audio based streams of the conference, each videophone 15 with its main controller 50 can determine where the talking is occurring at a given moment and cause the network interface card 56 to accept the MPEG-2 stream associated with the videophone 15 from which talking is occurring, and not accept the associated low frame rate stream. In another protocol, one videophone 15 is established as the lead or moderator videophone 15, and the lead videophone 15 picks what every other videophone 15 sees in terms of the large and small images. In yet another protocol, the choice of images as to who is large and who is small is fixed and remains the same throughout the conference. The protocol can be that each videophone 15 can pick how they want the images they receive displayed. Both the MPEG-2 based stream and the low frame rate stream are transmitted onto the network 40 to the receive videophones of the conference. Accordingly, both video based streams are available to each receive videophone 15 to be shown depending on the protocol for display 54 that is chosen.

In regard to the audio based streams that are transmitted by each videophone 15, to further effectively use the bandwidth, and to assist in the processing of the audio by decreasing the demands of processing placed on any transmit videophone 15 or receive videophone 15, an audio based stream can only be transmitted by a videophone 15 when there is audio above a predetermined decibel threshold at the transmit videophone 15. By only transmitting audio based streams that have a loud enough sound, with the assumption that the threshold would be calibrated to be met or exceeded when talking is occurring, this not only eliminates extraneous background noise from having to be sent and received, which essentially contributes nothing but uses bandwidth, but assists in choosing the MPEG-2 stream associated with the talking since only the audio streams that have talking are being received.

As mentioned above, if a given videophone 15 desires to see its own image that is being sent out to the other videophones 15, then the low frame rate stream that is formed by the FPGA 38 is sent to a local memory in the videophone 15, but without any compression, as would be the case for the low frame rate stream that is to be packetized and sent onto the network 40 from the videophone 15. From this local memory, the main processor with software will operate on it and cause it to be displayed as a small image on the display 54.

Furthermore, the videophone 15 provides for the control of which audio or video streams that it receives from the network 40 are to be heard or seen. In situations where the conference has more parties than a user of the videophone 15 wishes to see or hear, the user of the videophone 15 can choose to see only or hear only a subset of the video or audio streams that comprise the total conference. For instance, in a 100 party conference, the user chooses to see three of the video streams as large pictures on the screen, and 20 of the video streams as a small images on the screen, for a total of 23 pictures out of the possible 100 pictures that could be shown. The user of the videophone 15 chooses to have the three loudest talkers appear as the large pictures, and then chooses through the touch screen 20 of the parties in the conference, which are listed on a page of the touch screen, to also be displayed as the small pictures. Other protocols can be chosen, such as the 20 pictures that are shown as small pictures can be the last 20 talkers in the conference starting from the time the conference began and each party made his introductions. By controlling the number of video streams shown, organization is applied to the conference and utilization of the resources of the videophone 15 are better allocated.

In regard to the different pictures that are shown on the screen, a choice can be associated with each picture. For example, one picture can be selected by a moderator of the conference call, two of the pictures can be based on the last/loudest talkers at a current time of the conference, and the other picture can be associated with a person the user selects from all the other participants of the conference. In this way, every participant or user of the conference could potentially see a different selection of pictures from the total number of participants in the conference. The maximum bandwidth that is then needed is for one video stream being sent to the network, and four video streams being received from the network, regardless of the number of participants of the conference.

In regard to the audio streams, the limitation can be placed on the videophone 15 that only the audio streams associated with the three loudest talkers are chosen to be heard, while their respective picture is shown on the screen. The DSP 62 can analyze the audio streams that are received, and allow only the three audio streams associated with the loudest speakers to be played, and at the same time, directing the network interface 42 to only receive the first video streams of the large pictures associated with the three audio streams having the loudest talkers. Generally speaking, the more people that are talking at the same time, the more confusion and less understanding occurs. Thus, controls by the user are exercised over the audio streams to place some level of organization to them.

As part of the controls in regard to the audio streams, as mentioned above, each videophone 15 will only send out an audio stream if noise about the videophone 15 is above a threshold. Preferably, the threshold is dynamic and is based on the noise level of the three loudest audio streams associated with the three loudest talkers at a given time. This follows, since for the audio stream to be considered as one of the audio streams with the three loudest talkers, the noise level of other audio streams must be monitored and identified in regard to their noise level. The DSP 62 upon receiving the audio streams from the network interface 42 through the network 40, reviews the audio stream and identifies the three streams having the loudest noise, and also compares the noise level of the three received audio streams which have been identified with the three loudest talkers with the noise level of the scene about the videophone 15. If the noise level from the scene about the videophone 15 is greater than any one of the audio streams received, then the videophone 15 sends its audio stream to the network 40. This type of independent analysis by the DSP 62 occurs at each of the videophones in the conference, and is thus a distributive analysis throughout the conference. Each videophone, independent of all the other videophones, makes its own analysis in regard to the audio streams it receives, which by definition have only been sent out by the respective videophone 15 after the respective videophone 15 has determined that the noise about its scene is loud enough to warrant that at a given time it is one of the three loudest. Each videophone 15 than takes this received audio stream information and uses it as a basis for comparison of its own noise level. Each videophone 15 is thus making its own determination of threshold.

An alternative way of performing this distributed analysis is that each videophone, after determining what it believes the threshold should be with its DSP 62, can send this threshold to all the other videophones of the conference, so all of the videophones can review what all the other videophones consider the threshold to be, and can, for instance, average the thresholds, to identify a threshold that it will apply to its scene.

By using the technique of choosing the video streams of the three loudest talkers, there may be moments when parties start talking loudly all at once, and creating confusion and inability for understanding, but by doing so it raises the noise in the threshold level, resulting in very shortly the elimination of the audio streams that are not producing as much noise as others, so that only the audio streams of the three largest talkers will once again be chosen and heard, with the others not being chosen, and thus removing some of the noise that the other audio streams might be contributing. This implies that there may be times when more than three audio streams are received by the videophone 15 since more than three videophones may have a noise level above the threshold at a given moment, allowing each of such videophones to produce an audio stream at that time and to send it to the network 40. However, as just explained, once the threshold is changed, the situation will stop. This distributed analysis in regard to audio streams, is not limited to the videophone 15 described here but is also applicable to any type of an audio conference, whether there is also present video streams or not.

Consistent with the emphasis on conserving the use of bandwidth, and to send only what is necessary to conserve the bandwidth, clipping of an image occurs at the encoder 36 rather than at the receive videophone 15. In the instances where the transmit videophone 15 is aware of how its image will appear at the receive videophones 15, the encoder 36 clips the large image of the scene before it is transmitted, so there is that much less of the image to transmit and utilize bandwidth. If clipping is to occur at the receiver videophone 15, then the main processor with software will operate on the received image before it is provided to the display controller 52.

A second camera can be connected to the videophone 15 to provide an alternative view of the scene. For instance, in a room, the first camera, or primary camera, can be disposed to focus on the face of the viewer or talker. However, there may be additional individuals in the room which the person controlling the videophone 15 in the room wishes to show to the other viewers at the receive videophones 15. The second camera, for instance, can be disposed in an upper corner of the room so that the second camera can view essentially a much larger portion of the room than the primary camera. The second camera feed can be provided to the decoder 34. The decoder 34 has several ports to receive video feeds. Alternatively, if the stream from the second camera is already digitized, it can be provided to the processing elements of the videophone 15 through similar channels as the primary camera. Preferably, each videophone 15 controls whatever is sent out of it, so the choice of which camera feed is to be transmitted is decided by the viewer controlling the videophone 15. Alternatively, it is possible to provide a remote receive videophone 15 the ability to control and choose which stream from which camera at a given videophone 15 is to be transmitted. The control signals from the control videophone 15 would be transmitted over the network 40 and received by the respective videophone 15 which will then provide the chosen stream for transmission. Besides a second camera, any other type of video feed can also be provided through the videophone 15, such as the video feed from a DVD, VCR or whiteboard camera.

In a preferred embodiment, the videophone 15 operates in a peak mode. In the peak mode, the videophone 15 camera takes a still image of the scene before it and transmits this image to other videophones 15 that have been previously identified to receive it, such as on a list of those videophones 15 on its speed dial menu. Alternatively, in the peak mode, the still image that is taken is maintained at the videophone 15 and is provided upon request to anyone who is looking to call that videophone 15. Ideally, as is consistent with the preferred usage of the videophone 15, each videophone 15 user controls whatever is sent out of the videophone 15, and can simply choose to turn off the peak mode, or control what image is sent out. When an active call occurs, the peak mode is turned off so there is no conflict between the peak mode and the active call in which a continuous image stream is taken by the camera. The peak mode can have the still image of the scene be taken at predetermined time intervals, say at one-minute increments, five-minute increments, 30-minute increments, etc. In the peak mode, at a predetermined time before the still image is taken, such as five or ten seconds before the image is taken, an audible queue can be presented to alert anyone before the camera that a picture is about to be taken and that they should look presentable. The audible queue can be a beep, a ping or other recorded noise or message. In this way, when the peak mode is used, a peak into the scene before the camera of the videophone 15 is made available to other videophones 15 and provides an indication of presence of people in regard to the camera to the other videophones 15.

As another example of a presence sensor, the location of the automatic lens of the camera in regard to the field before it can act as a presence sensor. When no one is before the camera, then the automatic lens of the camera will focus on an object or wall that is in its field. When a person is before the camera, the automatic lens will focus on that person, which will cause the lens to be in a different position than when the person is not before the lens. A signal from the camera indicative of the focus of the lens can be sent from the camera to the FPGA 38 which then causes the focus information to be sent to a predetermined list of videophone 15 receivers, such as those on the speed dial list of the transmit videophone 15, to inform the receive videophones 15 whether the viewer is before the videophone 15 to indicate that someone is present.

The videophone 15 also provides for video mail. In the event a video call is attempted from one videophone 15 to another videophone 15, and the receive videophone 15 does not answer the video call after a predetermined time, for instance 4 rings, then a video server 66 associated with the receive videophone 15 will respond to the video call. The video server 66 will answer the video call from the transmit videophone 15 and send to the transmit videophone 15 a recorded audio message, or an audio message with a recorded video image from the receive videophone 15 that did not answer, which had been previously recorded. The video server 66 will play the message and provide an audio or an audio and video queue to the caller to leave their message after a predetermined indication, such as a beep. When the predetermine indication occurs, the caller will then leave a message that will include an audio statement as well as a video image of the caller. The video and audio message will be stored in memory at the video server 66. The message can be as long as desired, or be limited to a predetermined period of time for the message to be defined. After the predetermined period of time has passed, or the caller has finished and terminated the call, the video server 66 saves the video message, and sends a signal to the receive videophone 15 which did not answer the original call, that there is a video message waiting for the viewer of the receive videophone 15. This message can be text or a video image that appears on the display 54 of the receive videophone 15, or is simply a message light that is activated to alert the receive videophone 15 viewer that there is video mail for the viewer.

When the viewer wishes to view the video mail, the viewer can just choose on the touch screen 74 the area to activate the video mail. The user is presented with a range of mail handling options, including reading video mail, which sends a signal to the video server 66 to play the video mail for the viewer on the videophone 15 display 54. The image stream that is sent from the video server 66 follows the path explained above for video based streams to and through the receive videophone 15 to be displayed. For the videophone 15 viewer to record a message on the video server 66 to respond to video calls when the viewer does not answer the video calls, the viewer touches an area on the touch screen 74 which activates the video server 66 to prompt the viewer to record a message either audio or audio and video, at a predetermined time, which the viewer than does, to create the message.

The videophone 15 provides for operation of the speakers 64 at a predetermined level without any volume control by the user. The speakers 64 of the videophone 15 can be calibrated with the microphone so that if the microphone is picking up noise that is too loud, then the main controller 50 and the DSP 62 lowers the level of audio output of the speakers 64 to decrease the noise level. By setting a predetermined and desirable level, the videophone 15 automatically controls the loudness of the volume without the viewer having to do anything.

The videophone 15 can be programmed to recognize an inquiry to speak to a specific person, and then use the predetermined speech pattern that is used for the recognition as the tone or signal at the receive videophone 15 to inform the viewer at the receive videophone 15 a call is being requested with the receive videophone 15. For instance, the term "Hey Craig" can be used for the videophone 15 to recognize that a call is to be initiated to Craig with the transmit videophone 15. The viewer by saying "Hey Craig" causes the transmit videophone to automatically initiate a call to Craig which then sends the term "Hey Craig" to the receive videophone 15 of Craig. Instead of the receive videophone 15 of Craig ringing to indicate a call is being requested with Craig, the term "Hey Craig" is announced at the videophone 15 of Craig intermittently in place of the ringing that normally would occur to obtain Craig's attention. The functionality to perform this operation would be performed by the main controller 50 and the DSP 62. The statement "Hey Craig" would be announced by the viewer and transmitted, as explained above, to the server 66. The server 66, upon analyzing the statements, would recognize the term as a command to initiate a call to the named party of the command. The server 66 would then utilize the address information of the videophone 15 of Craig to initiate the call with the videophone 15 of Craig, and cause the signal or tone to be produced at the videophone 15 of Craig to be "Hey Craig".

As is well known in the art, the encoder 36 is able to identify the beginning and the end of each frame. As the encoder 36 receives the data, it encodes the data for a frame and stores the data until the frame is complete. Due to the algorithm that the encoder 36 utilizes, the stored frame is used as a basis to form the next frame. The stored frame acts as a reference frame for the next frame to be encoded. Essentially this is because the changes to the frame from one frame to the next are the focus for the encoding, and not the entire frame from the beginning. The encoded frame is then sent directly for packetization, as explained above, with out any buffering, except for packetization purposes, so as to minimize any delay. Alternatively, as the encoder 36 encodes the data for the frame, to even further speed the transmission of the data, the encoded data is ordered on for packetization purposes without waiting for the entire frame to be encoded. The data that is encoded is also stored for purposes of forming the frame, for reasons explained above, so that a reference frame is available to the encoder 36. However, separately, the data as it is encoded is sent on for packetization purposes and forms into a frame as it is also being prepared for packetization, although if the packet is ready for transmission and it so happens only a portion of the frame has been made part of the packet, the remaining portion of the frame will be transmitted with a separate packet, and the frame will not be formed until both packets with the frame information are received at the receive videophone 15.

Referring to FIG. 1, videophones 15 are connected to the network 40. videophones 15 support 10/100 ethernet connections and optionally ATM 155 Mbps connections, on either copper or Multimode Fiber. Each videophone 15 terminal is usually associated with a users PC 68. The role of the videophone 15 is to provide the audio and Video aspects of a (conference) call. The PC 68 is used for any other functions. Establishing a call via the videophone 15 can automatically establish a Microsoft Netmeeting session between associated PCs 68 so that users can collaborate in Windows-based programs, for example, a Power Point presentation, or a spread sheet, exchange graphics on an electronic whiteboard, transfer files, or use a text-based chat program, etc. The PC 68 can be connected to Ethernet irrespective of how the videophone 15 terminal is connected. It can, of course, also be connected to an ATM LAN. The PC 68 and the associated transmit videophone 15 communicate with each other through the network 40. The PC 68 and the associated transmit videophone 15 communicate with each other so the PC 68 knows to whom the transmit videophone 15 is talking. The PC 68 can then communicate with the PC 68 of the receive videophone 15 to whom the transmit videophone 15 is talking. The PC 68 can also place a call for the videophone 15.

Most of the system 10 functionality is server based, and is software running of the videophone 15 Proxy Server, which is preferably an SIP Proxy Server. One server 66 is needed to deliver basic functionality, a second is required for resilient operation, i.e. the preservation of services in the event that one server 66 fails. Software in the servers and in the videophone 15 terminal will automatically swap to the back up server 66 in this event. With this configuration, videophone 15 terminals can make or receive calls to any other videophone 15 terminal on the network 40 and to any phones, which are preferably SIP phones, registered on the network.

Media Servers provide a set of services to users on a set of media streams. The media server 66 is controlled by a feature server 66 (preferably an feature server 66). It is employed to provide sources and sinks for media streams as part of various user-invocable functions. The services provided on the media server 66 are:

Conference Bridging
Record and Playback
Transcoding
Tones and announcements

The media server 66 is a box sitting on the LAN or WAN. In general, it has no other connections to it. It is preferably an SIP device. The feature servers are in the signaling path from the videophone 15 terminals. The media path, however, would go direct from the media server 66 to the appliance.

In operation, the user may ask for a function, such as videomail. The feature server 66 would provide the user interface and the signaling function, the media server 66 would provide the mechanisms for multimedia prompts (if used) and the record and playback of messages.

To enable a videophone 15 terminal to make or accept calls to any non protocol or standard (such as SIP) (video) phones, a Gateway 70, such as an SIP gateway, is added. A four analogue line gateway 70 can be connected either directly to the PSTN, or to analogue lines of the local PBX. The normal rules for provisioning outgoing lines apply. Typically one trunk line is provisioned for every six users, i.e. it assumes any one user uses his phone to dial an external connection 10 minutes out of any hour. If the videophone 15 terminal is to act as an extension on a current PBX as far as incoming calls are concerned then one analogue line is needed for every videophone 15.

TV sources, such as CNN, are available to the videophone 15 user. The videophone 15 Video Server 66 enables this service. The Server 66 supports the connection of a single Video channel that is then accessible by any videophone 15 user on the network 40. The Video channel is the equivalent of two normal conference sessions. A tuner can set the channel that is available. A new videophone 15 Video Server 66 should be added to the configuration for each different channel the customer wishes to have available simultaneously.

The videophone 15 server 66 (preferably SIP) also contains a database for user data, including a local cache of the users contact information. This database can be synchronized with the users main contact database. Synchronization can be used, for instance, with Outlook/Exchange users and for Lotus Notes users. A separate program that will run on any NT based server 66 platform does synchronization. Only one server 66 is required irrespective of the number of sites served.

Figure 2:
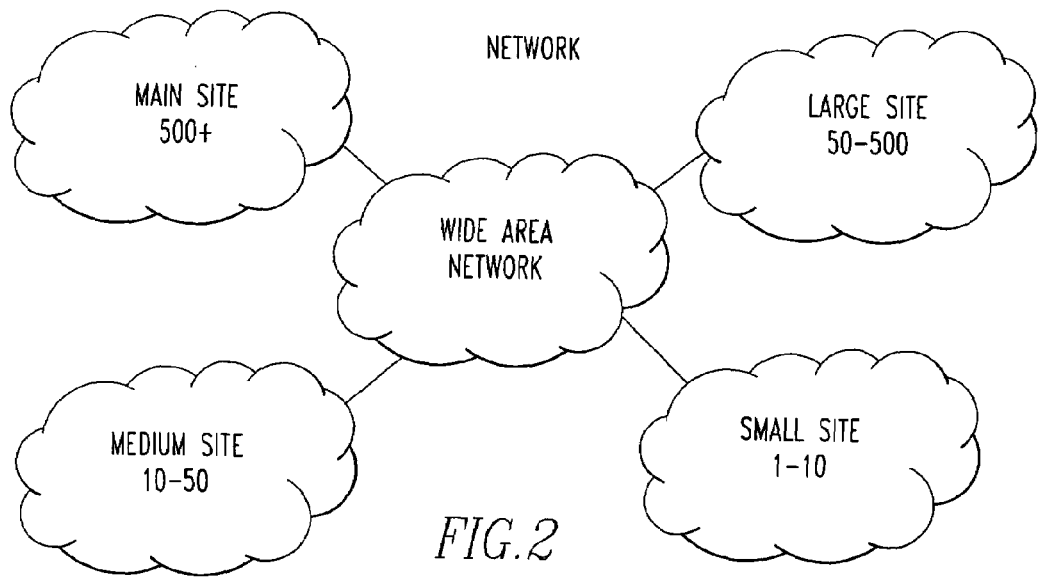
FIG. 2 is a schematic representation of a network of the present invention.

As shown in FIG. 2, usually videophone 15 terminals will be distributed across several sites, joined by a Wide Area network 40. One server 66 is sufficient to serve up to 100+ videophones 15 on a single campus. As the total number of videophones 15 on a site increases, at some stage more servers need to be installed.

With videophones 15 distributed across several sites, it is possible for them to operate based on central servers, but this is not a recommended configuration, because of the WAN bandwidth used and the dependence on the WAN. Preferably, each site has at least one server 66, which is preferably an SIP server 66 when SIP is used. For the more cautious, the simplest and easiest configuration is if each site has duplicated servers, preferably each being SIP servers. However using a central server 66 as the alternate to remote site servers will work too.

Videophones 15 anywhere in the network 40 can make PSTN or PBX based outgoing calls from a single central gateway 70. However, if there is the need for the videophone 15 to also be an extension on a local PBX to accept incoming calls then a PSTN gateway 70 needs to be provided at each location. There needs to be a port on the gateway 70 for every videophone 15 on that site.

A central CNN server 66 can distribute TV channel to any videophone 15 on the network 40. Nevertheless, it may be preferable to include site specific servers than take that bandwidth over the WAN.

A videophone 15 is available to connect to either a 10/100 Ethernet network 40 or an ATM network 40 at 155 Mbits/sec (with both Fiber and Copper options). An ATM connected videophone 15 uses an IP control plane to establish the ATM addresses of the end-points for a call, and then uses ATM signaling to establish the bearer channel between those end points. The bearer channel is established a Switched Virtual Circuit (SVC), with the full QoS requirements specified.

Each video stream is between 2 Mbps and 6 Mbps duplex as determined by settings and bandwidth negotiation. As the display means can show more than a single video stream, the overall required connection bandwidth to each videophone increases with the number of parties in the call. Transmit end clipping ensures that the maximum required bandwidth is approximately 2.5 times the single video stream bandwidth in use. If there are several videophones 15 on a site, the normal telephone ratio between users and trunks will apply to videophone 15 sessions. In other words, a videophone 15 user is expected to talk on average to two other people in each call, i.e. two streams and will use the videophone 15 on average 10 minutes in the hour. For the average encoding rate of 3 Mbps, this gives a WAN bandwidth need of 6 Mbps which can be expected to support up to 6 users.

Figure 3:
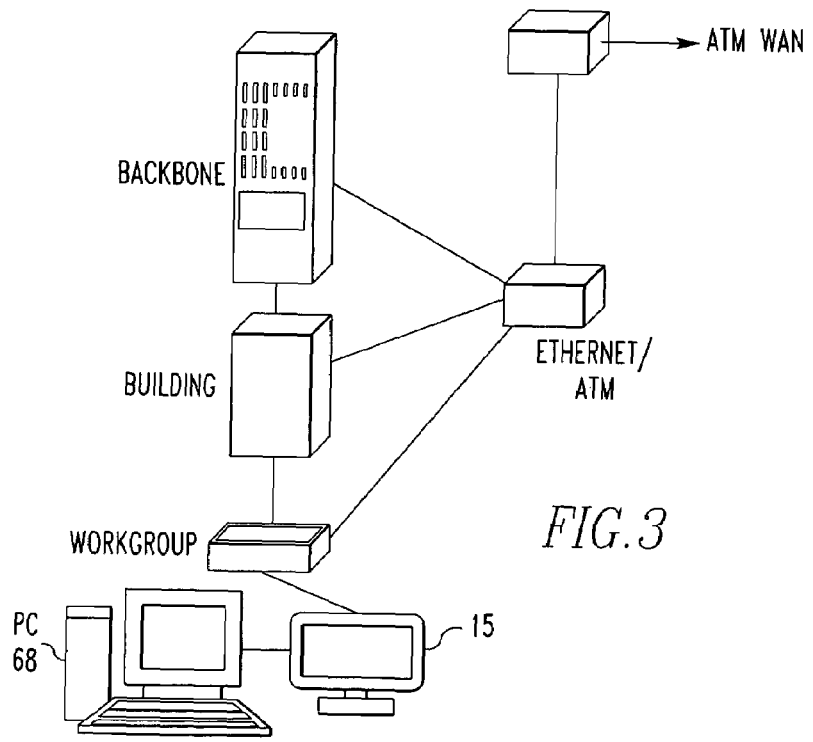
FIG. 3 is a schematic representation of a videophone connected to a PC and a network.

As shown in FIG. 3, the videophone 15 operates on a 'p' enabled Ethernet network 40, when there is a low density of videophone 15 terminals. The videophone 15 system 10 will establish an SVC across the ATM portion of the network 40 linking the two videophones 15 together, and make use of the 'p' enabled Ethernet to ensure sufficient Quality of Service is delivered over the Ethernet part of the connection.

Figure 4:
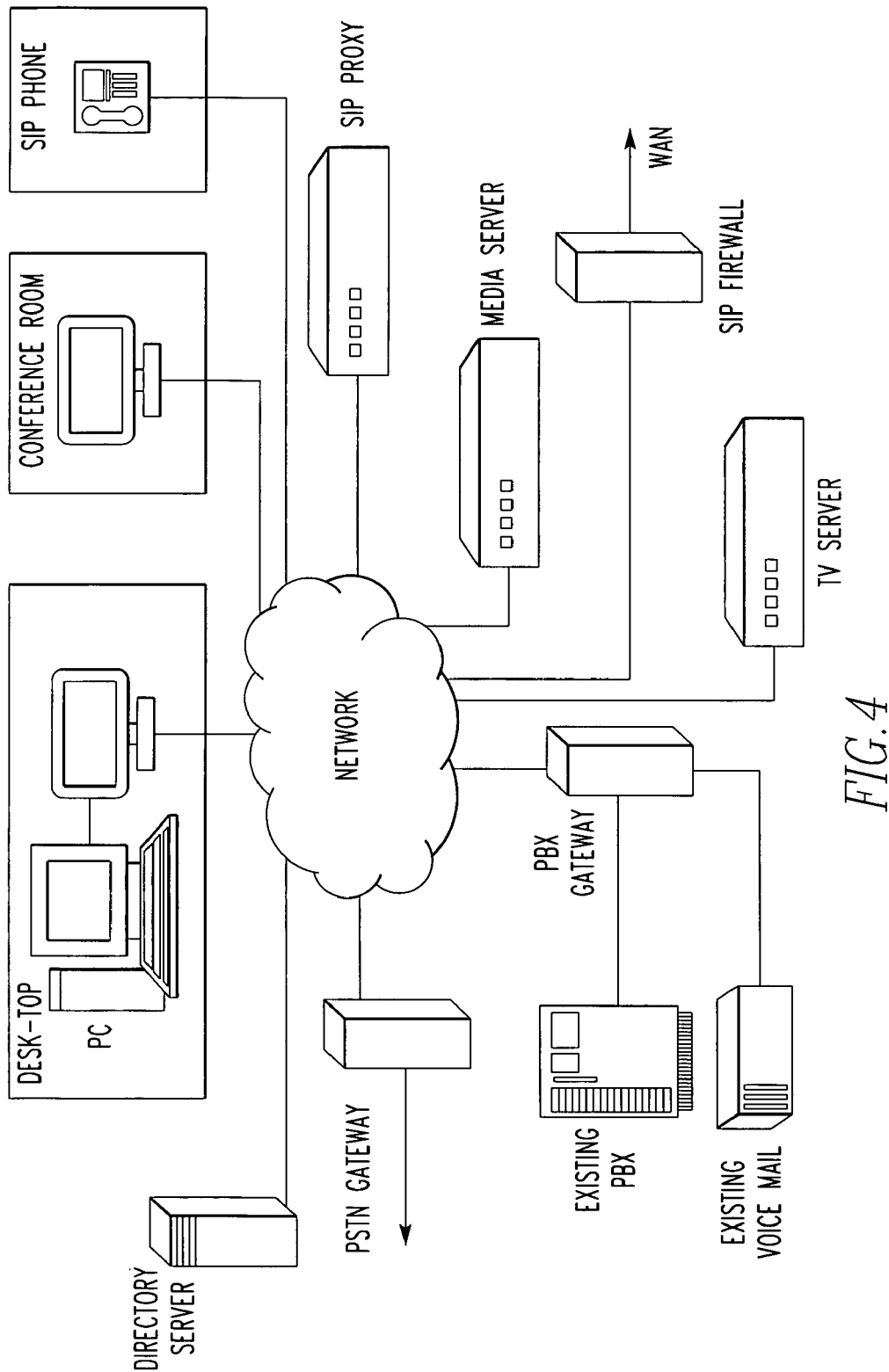
FIG. 4 is a schematic representation of the system of the present invention.

The essential elements of the videophone 15 system 10 are shown in FIG. 4. Together they create multi-media collaboration tools greatly enhancing the ability of geographically dispersed teams to interact. Such teams are increasingly common in almost every large enterprise, yet the tools to help them work effectively and efficiently are little changed from a decade ago and are in many respects unsatisfactory. Videophone 15 addresses the many issues of existing systems in a comprehensive way to create a discontinuous improvement in remote collaboration. It is enabled by newly available technology, differentiated by Quality of Service and the right mix of functions, made useable by the development of an excellent user interface, and designed to be extensible by using a standards based architecture.

The audio and video streams, as explained above, are transmitted from the originating videophone 15 to terminating videophones 15 on the network using, for example, well known SIP techniques. SIP messages may be routed across heterogeneous networks using IP routing techniques. It is desirable for media streams in heterogeneous networks to have a more direct path. Preferably, in instances where the originating videophone 15 of a conference is connected to an Ethernet, and a terminating videophone 15 of the conference is connected to an ATM network, as shown in FIG. 15, the following addressing of the packets that cross the network between the originating and terminating videophones occurs. The originating videophone 15 sends a packet onto the Ethernet to which it is an communication with the originating videophone's IP address. The packet reaches an originating gateway 80 which links the Ethernet with the ATM network. At the originating gateway 80, the IP address of the originating videophone 15 is saved from the packet, and the originating gateway 80 adds to the packet the ATM address of the originating gateway 80 and sends the packet on to the terminating videophone 15. When the terminating videophone 15 receives the packet, it stores the ATM address of the originating gateway 80 from the packet, and sends back to the originating gateway 80 a return packet indicating that it has received the packet, with the ATM address of the terminating videophone 15. The originating gateway 80, when it receives the return packet saves the ATM address of the terminating videophone 15 and adds the IP address of the originating gateway 80 to the return packet. The return packet is then sent from the originating gateway 80 back to the originating videophone 15.

In this way, the specific addresses of each critical node of the overall path between and with the originating videophone 15 and the terminating videophone 15 is known to each critical node of the path. At minimum, each node on the path knows the address of the next node of the path, and if desired, additional addresses can be maintained with the respective packets as they move along the path so each node of the path knows more in regard to addresses of the critical nodes then the next node that the packet goes to. This is because as the packet moves from node to node, and specifically in the example, from the originating videophone 15 to the originating gateway 80 to the terminating videophone 15 and then back to the originating gateway 80 and then to the originating videophone 15, each node saves the critical address of the previous node from which to the respective packet was received, and introduces its own address relative to the type of network the next node is part of. Consequently, all the critical addresses that each node needs to send the packet onto the next node are distributed throughout the path.

This example of transferring a packet from an originating videophone 15 on an Ethernet to a terminating videophone 15 on an ATM network also is applicable for the reverse, where the originating terminal or videophone 15 is in communication with an ATM network and the terminating videophone 15 is in communication with an Ethernet.

Similarly, the path can involve an originating videophone 15 in communication with an Ethernet and a terminating videophone 15 in communication with an Ethernet where there is an ATM network traversed by the packet in between, as shown in FIG. 16. In such a case, there would be two gateways at each edge where there is an interface between the Ethernet and the ATM network. As explained above, the process would simply add an additional node to the path, where the originating gateway 80 introduces its own ATM address to the packet and sends it to the terminating gateway 82 which saves the originating gateway's ATM address and adds the terminating gateway's IP address to the packet, which it then sends onto the terminating videophone 15 on the Ethernet. With the return packet, the same thing happens in reverse, and each gateway saves the respective address information from the previous gateway or terminating videophone 15, and adds its own address to the return packet that it sends on ultimately to the originating videophone 15, with the originating gateway 80 and the originating videophone 15 saving the ATM address of the terminating gateway 82 or the originating gateway 80, respectively, so the respective addresses in each link of the overall path is stored to more efficiently and quickly send on subsequent packets of a connection.

For instance, the main controller 50 and the network interface 42 of the videophone 15 can add the address of the videophone 15 to each packet that it sends to the network 40 using the same techniques that are well known to one skilled in the art of placing SIP routing information (or whatever standard routing information is used) with the packet. The network interface 42 also stores the address information it receives from a packet from a node on the network in a local memory. Similarly, for a gateway on the network 40, the same can be applied. As is well known, the gateway has controlling means and a data processing means for moving a packet on to its ultimate destination. A network interface 42 and a main controller 50 of the controlling mechanism of the gateway, operating with well known techniques in regard to SIP routing information, stores address information received from a packet and places its own address information relative to a network 40 in which it is going to send the packet, with the packet. For example, the address information of the gateway, or the videophone 15, can be placed in a field that is in the header portion associated with the packet. It should be noted, that while the example speaks to the use of videophones 15 as terminating and originating sources, any type of device which produces and receives packets can be used as a node in this overall scheme.

The Virtual Presence Video-Phone (videophone) 15 is a desk top network 40 appliance that is a personal communications terminal. It replaces the phone on the users desk, providing all the features of a modern PBX terminal with the simplicity of user interface and ease of use afforded by videophones' 15 large touch screen 74.

Videophone 15 adds the video dimension to all interpersonal communications, changing the experience to that of virtual presence. In the past the quality of video on video conference systems has not been high enough for the technology to be transparent. videophone 15 is the first personal videophone to deliver high enough video quality to create the right experience. For effective real time video communication not only has the picture quality to be close to broadcast TV quality, but the latency must be kept very low. Lip Sync is also important if a natural conversation is to flow. All these issues have been addressed in the design of the videophone 15 video subsystem. videophone 15 uses the latest encoder 36 and decoder 34 technology configured specifically for this application. In other words, videophone 15 gets as close as possible to 'being there'.

Videophone 15 also greatly improves on conventional speaker phone performance through the use of a high fidelity, near CD quality audio channel that delivers crystal clear voice. Stereo audio channels provide for spatial differentiation of each participants audio. Advanced stereo echo cancellation cancels not only all the sound from the units speakers 64 but enables the talker to carry on a conversation at normal conversational levels, even when in a noisy room.

Videophone 15 directly supports the establishment of up to 4 remote party (i.e. 5 way) video conference calls and or up to 10 party audio conference calls. Each user has visibility on the availability of all other members of his/her work group. The videophone 15 preferably uses Session Initiation Protocol (SIP) as a means of establishing, modifying and clearing multi-stream multi-media sessions. Videophone 15 can establish an audio call to any other SIP phone or to any other phone via a gateway 70.

Videophone 15 places high demands on the network 40 to which it is attached. Videophone 15 video calls demand a network 40 that can supply continuous high bandwidth, with guarantees on bandwidth, latency and jitter. Marconi plc specializes in providing networks that support high Quality of Service applications. A conference room version of videophone 15 is also available.

The videophone 15 is a communications terminal (platform) that has the capability of fully integrating with a user's PC 68, the computing platform. A videophone 15 application for the PC 68 provides a number of integration services between the PC 68 and the associated videophone 15 terminal. This will include the automatic establishment of NetMeeting sessions between the parties in a videophone 15 conference call, if so enabled, for the purpose of sharing applications such as whiteboard, or presentations, etc. other capabilities including "drag and drop" dialing by videophone 15 of a number on the PC 68.

A set of servers, preferably each being SIP servers, provide call control and feature implementation to the network 40 appliances. These are software servers running on standard computing platforms, capable of redundancy. These servers also run a local copy of the users contact information database and users preference database. Applications available on these servers provide access to corporate or other LDAP accessible directories.

A synchronization server 66 maintains synchronization between the users main contact database and the local copy on the server 66 (preferably SIP). Outlook Exchange or Lotus Notes synchronization is supported. A set of Media Gateways 70 are used to the analogue or digital PSTN network 40. A set of Media Gateways 70 interfaces to the most common PABX equipment, including the voice mail systems associated with those PABX's.

The Media server 66 provides a number of services to the videophone 15 terminal. It acts as a Bridging-Conference server 66 for video conference over 4 parties, if desired. It can also provide transcoding between the videophone 15 standards and other common audio or video formats, such as H320/H323. It can provide record and playback facilities, enabling sessions to be recorded and playback. It can provide the source of tones and announcements.

A Firewall according to the standard being used, such as an SIP Firewall, is required to securely pass the dynamically created RTP streams under the control of standard proxy software (such as SIP proxy software). A TV server 66 acts as a source of TV distribution, allowing videophone 15 users to select any channel supported, for example CNN.

Videophone 15 is for Ethernet and ATM desktops. The videophone 15 terminal will support end to end ATM SVC's and use them to establish connections with the requisite level of Quality of Service. Videophone 15 will also support IP connectivity via LANE services. For this to guarantee the required QoS, LANE 2 is required. The videophone 15 provides ATM passthrough to an ATM attached desk-top PC 68, or an ATM to Ethernet pass through to attach the PC 68 via Ethernet.

The videophone 15 requires the support of end to end QoS. For an Ethernet attached videophone 15 the user connection needs to support 802.1p, DiffServ and/or IntServ or better. If the destination is reachable via an ATM network 40, an Ethernet to ATM gateway 70 will be provided. The SIP proxy server 66 and SIP signaling will establish the ATM end-point nearest to the target videophone 15 terminal, i.e. its ATM address if it is ATM attached, or the ATM Ethernet gateway 70 that is closest. Signaling will establish an SVC across the ATM portion of the network 40 with the appropriate QoS. This SVC will be linked to the specific Ethernet flow generating the appropriate priority indication at the remote end.

The videophone 15 product line consists of several end terminals (appliances), a set of servers which provide features not built into the appliances, and a set of gateways 70 that connect the products to existing facilities and outside PSTN services. The basic functionality provided by the system 10 is:

Telephony Services, with video available on all "on-net" calls, very high quality audio and video Multiparty Conference Services, audio and video, ad hoc or prescheduled, completely self-serve, fully integrated into the telephony services Presence Services—with a variety of tools to determine availability for collaboration Shared Surface Services—electronic whiteboard, application sharing, document sharing, presentation broadcast Other value added services such as broadcast video (Mikes message to the troops) TV distribution. Online interactive training, etc. Session recording services is also available, if desired.

Videophone 15 is a telephone with dramatic new functionality, not a computer trying to do what a telephone does. This allows full concurrent use of a computer for the things that it is good at, while providing a flexible but application specific appliance for communication. The user interface and physical design can be tuned for this application, providing an instant on, highly reliable communications device like current phones, something that the PC 68 will never be. This approach also provides control over the operating environment of the device, eliminating the support problems related to PC 68 hardware and software configuration issues.

Human factor studies have demonstrated time after time that audio quality is the single most important factor for effective, transparent communication. While a handset is necessary, excellent quality hands free audio including Acoustic Echo Cancellation (AEC), Automatic Gain Control (AGC), wide band audio capability (G.722 8 kHz bandwidth or better), stereo output, and integration with the PC 68 sound output provides new levels of effective remote collaboration. A high quality microphone array, designed and processed to limit tin-can effects is also present.

A simple, clean, intuitive, fully flexible platform for visual output and button/selection input is used. In the first videophone model, this is a high quality TFT full color screen, 17" diagonal 16 by 9 screen with 1260×768 resolution or better, overlaid with a medium resolution high life touch-panel. A bright (>200 nit), extended viewing angle (>+−60°) active matrix panel is used to display full motion video for comfortable viewing in an office environment. Larger, brighter, faster, higher contrast, and higher viewing angle screens can be used.

The videophone 15 uses a TFT color LCD, having PC 68 like architecture with a VGA type display 54 interface based on an Intel Celeron/440 MMX and a Lynx VGA controller.

A high quality digital 480 line progressive scan camera is used to provide 30 frames per second of at least 640×480 video. Videophone 15 uses MPEG2 encoding taking advantage of the video encoder 36 technology for set top boxes. A variety of different bit rates can be generated, allowing the video quality to adapt to the available resources for one-to-one calls, and to the highest quality participant for one or many-to-many calls. An integrated high quality camera module is positioned close to the screen, with an external video input (Firewire) provided to allow the use of additional cameras, VCRs, or other video sources.

An existing 10/100 BaseT Ethernet connection to the desktop is the only connection necessary for communication to the LAN, WAN, PC 68 desktop, and various servers, proxies, and gateways 70. Time critical RTP streams for audio and video are marked with priority using 802.1 p, supplying the mechanism within the Ethernet domain of the LAN for QoS. DiffServ is also supported, with RSVP as an option. In order to eliminate the need for additional building wiring to the desktop, the videophone 15 will include a small 10/100 Ethernet switch, allowing the existing desktop port to be used for both the phone and the PC 68.

Videophone 15 also supports an ATM interface. The interface is based on using the HE155 Mbits/sec card with either a fiber or copper interface. The videophone 15 provides an ATM pass-through port to connect to an ATM connected desktop or to connect an Ethernet connected PC 68 to the ATM connected videophone 15.

The cost and performance tradeoffs for the conference room environment are obviously different than those for the desktop. Video projection, multiple cameras with remote Pan/Tilt/Zoom, multiple microphones, multiple video channels, rear projection white boards, and other products appropriate for the conference room environment are integrated into a conference room videophone 15. The interworking of the conference room environment and the desktop is seamless and transparent. This environment will make heavy use of OEM equipment that is interfaced to the same infrastructure and standards in place for the desktop. The hardware design is essentially the same, with additional audio support for multiple microphones, and additional video support for multiple cameras and displays. Alternatively, a PC 68 application, either mouse or touch screen 74 driven, if the PC 68 has as touch screen 74, that links to a low cost SIP phone can be used. For those desktops and other places that do not require the collaboration capabilities described above, a standard phone can be used that works with the system 10 without requiring additional wiring or a PBX.

Using the SIP (Session Initiation Protocol) standard, the terminal devices are supported by one or more servers that provide registration, location, user profile, presence, and various proxy services. These servers are inexpensive Linux or BSD machines connected to the LAN.

The videophone 15 is the phone, so a key set of PBX functions must be provided, including transfer, forward, 3 (and 4, 5, . . .) party conferencing, caller ID+, call history, etc. Some of these features may be built on top of a SIP extension mechanism called "CPL", which is actually a language to provide call handling in a secure, extensible manner.

The videophone 15 provides for active presence and instant messaging. Perhaps the most revolutionary tool for improving day to day distributed group collaborative work, presence allows people to know who's in and what they're doing. It provides the basis for very low overhead calling, eliminating telephone tag and traditional number dialing, encouraging groups to communicate as a group rather than through the disjoint one-to-one phone conversations that are common now. Integration with Instant Messaging (real time email) provides a no delay way of exchanging short text messages, probably making use of the PC 68 keyboard for input.

The videophone 15 provides for distributed/redundant architecture. This is the phone system 10 and it must be reliable. It should also be able to be centrally managed with local extensions, with distributed servers providing "instant" response to all users. Each of the different SIP proxy functions, for instance, if SIP is used, will be deployed such that they can be arbitrarily combined into a set of physical servers, with redundant versions located in the network 40.

Microsoft NetMeeting is used for shared surface and shared application functionality. Computer/Telephony Interface (CTI) for the PC 68 and PDA, with features such as integrated contact lists, auto-dialing of selected phone numbers or names, calendar logging of call history, automatic entry of contacts, etc. can be used.

SIP presents challenges to firewalls because the RTP flows use dynamically allocated UDP ports, and the address/port information is carried in SIP messages. This means the Firewall has to track the SIP messages, and open "pin holes" in the firewall for the appropriate address/port combinations. Further, if NAT is employed, the messages must be altered to have the appropriate translated address/ports. There are two ways to accomplish such a task. One is to build the capability into the firewall. The top 3 firewall vendors (Checkpoint, Network Associates and Axxent) provide this. An alternative is to have a special purpose firewall that just deals with SIP in parallel with the main firewall. There are commercial versions of such a firewall, for example, that of MicroAppliances. It should be noted that SIP or NetMeeting are preferred embodiments that are available to carry out their necessary respective functionality. Alternatives to them can be used, if the necessary functionality is provided.

Figure 5A:
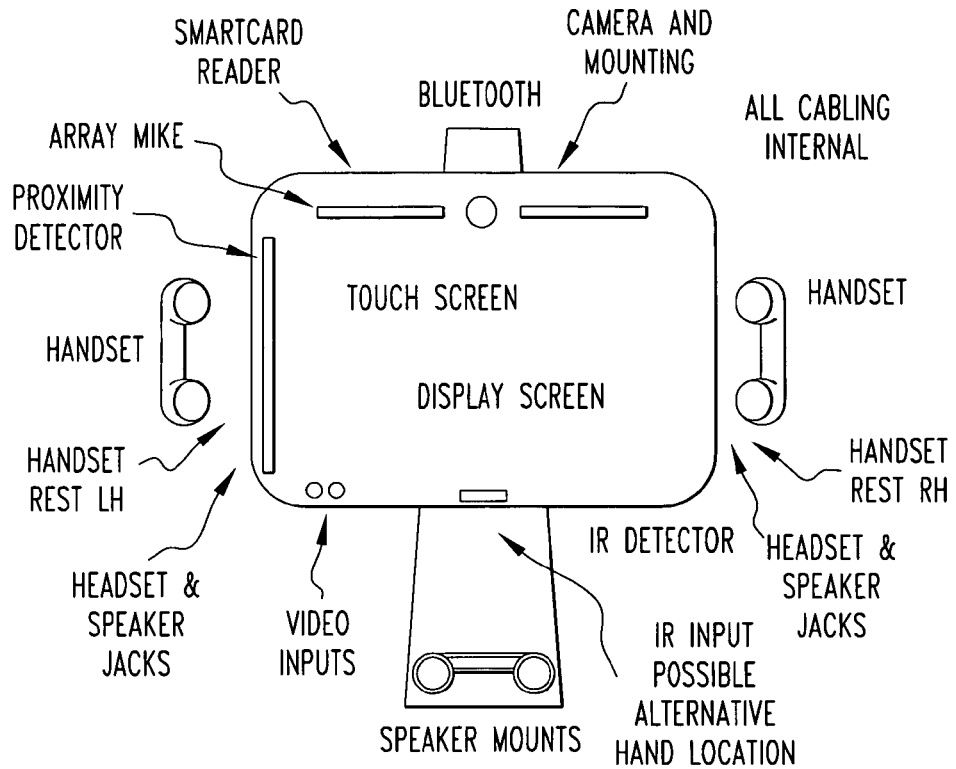
FIGS. 5a and 5b are schematic representations of front and side views of the videophone.
Figure 5B:
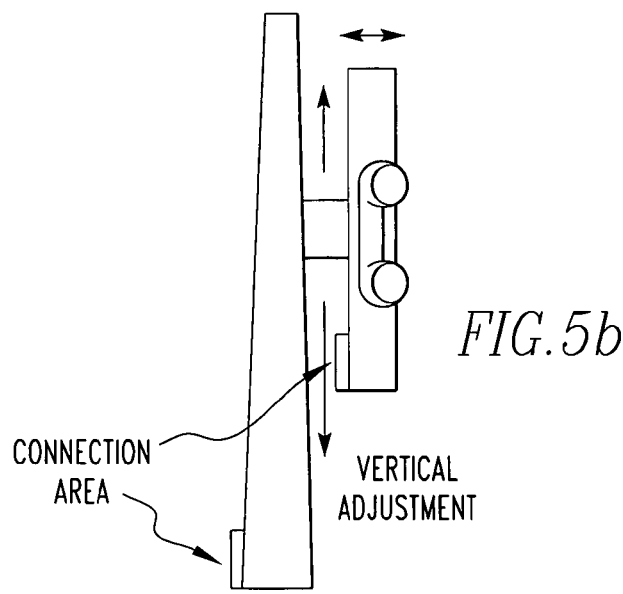

FIG. 5 shows the main physical components of the videophone 15 terminal. The stand provides a means of easily adjusting the height of the main display 54 panel and of securing the panel at that height. The range of height adjustment is to be at least 6 inches of travel to accommodate different user heights. It is assumed that the stand will sit on a desk and that desktop heights are standardized. The link between the stand and the main unit must provide for a limited degree of tilt out of the vertical to suit user preference and be easily locked at that angle. The amount of tilt needed –0+15° from the vertical. The main unit can directly wall mount without the need of the stand assembly as an option.

The main unit case provides the housing for all the other elements in the videophone 15 design including all those shown in FIG. 5 and all the internal electronics. The case provides for either left-hand or right-hand mounting of the handset. Right-handed people tend to pick up the handset with the left hand (because they will drive the touch screen 74 and write with the right) and left handed people the reverse. Though the left hand location will be the normal one, it must be possible to position the handset on the right. A Speaker jack is provided on the case to allow the speakers 64 to be mounted remote from the videophone 15. Inputs are provided to handle the speaker outputs from the associated PC 68, so that videophone 15 can control the PC 68 and videophone 15 audio. Implementation of a wireless connection to speakers 64 (via Bluetooth, or SONY standards) can be used.

A handset is provided with the unit and should connect using a standard RJ9 coiled cable and connector jack. When parked the handset should be easy to pick-up and yet be unobtrusive. A handset option provides an on handset standard keypad. A wireless handset to improve mobility of the terminal user can be used.

A jack is provided for the connection of a stereo headset+microphone. Use of headsets for normal phone conversations is increasing. The user shall be able to choose to use a headset+boom mounted microphone, or a headset only, employing the microphone array as the input device. There is an option for a wireless headset to improve mobility of the terminal user.

An IR port is provided to interface to PDA's and other IR devices, in a position on the main case to allow easy access.

For the moment IR interfaces on phones and PDA's are the most common and therefore for the same reasons as a bluetooth interface is required so too is an IR interface.

An array microphone is embedded in the casing. The array must not generate extraneous noise as a consequence of the normal operation of the terminal. Specifically, it should not be possible to detect user action on the touch-panel. The array microphone allows a user to talk at normal conversational levels within an arc (say 6 feet) round the front of the units and 110° in the horizontal plane and in the presence of predefined dbs of background noise. The unit must provide unambiguous indication that the microphone is active/not active, i.e. the equivalent of 'on-hook' or 'off-hook'. A videophone 15 user will want re-assurance that he is not being listened into without his knowledge. This is the audio equivalent of the mechanical camera shutter.

The main videophone 15 unit may have a smart card reader option to provide secure access to the terminal for personal features. Access to videophone 15 will need an array of access control features, from a simple password logon on screen, to security fob's. A smart card reader provides one of these access methods.

There is clearly an advantage if the tilt and pan is controllable from the screen, and preferably, if Pan and Tilt are electronic only and need no mechanical mechanisms. The camera mount should be mounted as close to the top of the main screen as possible to improve eye contact.

The camera should be a digital camera 47 capable of generating 480 p outputs. The camera output feeds an MPEG-2 encoder 36. It should be possible to dynamically configure the camera so that the camera output is optimized for feeding the encoder 36 at the chosen encoder 36 output data-rate. Faces form the majority of input the camera will receive, and therefore the accurate capture under a wide range of lighting conditions of skin tone is an essential characteristic.

The camera should be operated in a wide range of lighting conditions down to a value of 3 lux. The camera should provide automatic white balance. White balance changes must be slow, so that transients on the captured image do not cause undue picture perturbation. Only changes that last over 5 seconds should change the white balance. The camera should be in focus from 18 inches inches to 10 feet, i.e. have a large depth of field and desirably be in focus to 20 feet. Both the user and the information if any on his white board both need to be in focus. Auto-focus, where the camera continually hunts for the best focus as the user moves, produces a disturbing image at the receiver end and must be avoided.

The camera should allow a limited zoom capability, from the setting where one user is directly in front of the camera, to another setting where a few users are simultaneously on one videophone 15. As an alternative, different lenses may be provided. This can be specified in terms of lens field of view, from say a 30° field to view to a 75° field of view.

The camera should be able to input a larger picture than needed for transmission, for example a 1280×960 image. This would allow for limited zoom and horizontal and vertical pan electronically, removing the need for electromechanical controls associated with the camera. The camera should be physically small, so that an 'on-screen' mounting is not eliminated simply by the size of the camera.

A medium resolution long life touch panel forms the primary method of communicating with the videophone 15 and forms the front of the main display 54. The panel will get a lot of finger contact and therefore must withstand frequent cleaning to remove smears and other finger prints that would otherwise affect the display 54 quality. It should be easy to calibrate the touch panel, i.e. ensure that the alignment between the area touched on the touch panel and the display 54 underneath will result in meeting the 'false touch' requirement.

The touch screen 74 surface must minimize surface reflections so that the display 54 is clear even when facing a window. The requirement is that 'false touches' are rare events. The resolution requirement on the touch panel is therefore heavily dependent on the smallest display 54 area touch is trying to distinguish. The resolution and the parallax error combined should be such that the chance of a 'false touch' due to these factors by the average trained user is less than 5%. (One false touch in 20 selections). It is desirable that this false touch ratio is less than 2%, i.e. one false touch in 50 selections.

Where appropriate, audible and or visible feedback of a successful touch must be given to the user. These tones may vary depending on what is on the touch screen 74 display 54 at the time. For example when using a keyboard, keyboard like sounds are appropriate, when using a dial-pad different sounds are likely to be relevant and so on. Audible feedback may not be needed in all circumstances, though usually some audible or visible indication of a successful touch is helpful to the user. It should be possible for the user to be able to turn tones on and off and set the tones, tone duration and volume level associated with the touch on some settings screen. Default values should be provided. The touch screen 74 can also be used with a stylus as well as the finger.

The display 54 panel should be at least 17" diagonal flat panel (or better) full color display 54 technology, with a 16×9 aspect ratio preferred but a 16×10 aspect ratio being acceptable.

The screen resolution should be at least 1280×768. The viewable angle should be at least 6° off axis in both horizontal and vertical planes. The screen contrast ratio should be better than 300:1 typical. The color resolution should be at least 6 bits per color, i.e. able to display 262 K colors 6 bits per color is acceptable for the prototype units. 8 bits per color is preferred, other things being equal, for the production units. The display 54 panel should have a high enough brightness to be viewed comfortably even in a well lit or naturally lit room. The brightness should be at least 300 cd/m$^2$. The display 54 and the decode electronics should be able to display 720 P high resolution images from appropriate network 40 sources of such images.

The back light shall have a minimum life to 50% of minimum brightness of at least 25,000 hours. If the back-light is turned off due to inactivity on the videophone 15 terminal, then it should automatically turn on if there is an incoming call and when the user touches anywhere on the touchscreen. The inactivity period after which the touchscreen is turned off should be settable by the user, up to "do not turn off".

Figure 6:
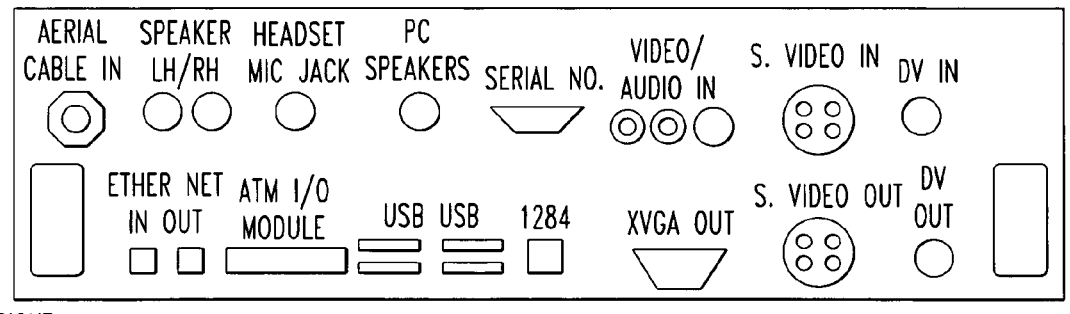
FIG. 6 is a schematic representation of a connection panel of the videophone.

The connections required in the connection area of the videophone 15 are as shown in FIG. 6. Each connector requirement will be briefly described in paragraphs below.

Two RJ 45 10/100 Ethernet connectors are for connection to the network 40 and from the associated PC 68.

An optional plug in ATM personality module shall be provided that enables the videophone 15 to easily support 155 Mbits/sec interfaces for both Optical and copper interfaces.

A USB port shall be provided to allow various optional peripherals to be easily connected, for example a keyboard, a mouse, a low cost camera, etc.

A 1394 (Firewire) interface should be provided to permit connection to external (firewire) cameras or other video sources. The interface should permit full inband camera control over the firewire interface. Where necessary external converters should be used to convert from say S-Video to the firewire input. It should be possible to use this source in place of the main camera source in the videophone 15 output to the conference. It should also be possible to specify normal or "CNN" mode i.e. clippable or not clippable on this video source. An XVGA video output should be provided to enable the videophone 15 to drive external projectors with an image that reflects that displayed on the main display 54.

An audio input shall be provided for PCAudio output. To ensure integration of the PC 68 audio and videophone 15 audio, only one set of speakers 64 will be deployed. The PC 68 sound will pass through the audio channel of the videophone 15. A jack or pair of jacks shall be provided to connect to a head-set and attached boom microphone. Headset only operation, using the built in microphone array must also be possible. If the headset jack is relatively inaccessible, it should be possible to leave the headset plugged in, and select via a user control whether audio is on the headset or not. Connections are provided to external left and right hand speakers 64. It is possible to use one, two or three videophone 15 units as though they were a single functional unit, as illustrated in FIG. 7.

In configurations of more than one videophone 15, only one unit acts as the main control panel, the other unit(s) display video and those controls directly associated with the video being displayed. Only one set of speakers 64 will be needed for any of these configurations.

A number of options shall be provided as far as microphone inputs and audio streams are concerned, from using a single common microphone input, to transmitting the audio from each microphone array to the sources of the video on that videophone 15.

A number of options shall be provided for Video inputs. The default shall be to transmit the view of the 'control panel' videophone 15. If more bandwidth is available then each user can get the Video from the screen on which the user is displayed, yielding a more natural experience. All co-ordination of the multiple videophone 15 terminals can be achieved over the LAN connection, i.e. not need any special inter-unit cabling.

The videophone 15 videophone provides its user with a number of main functions:

It is the office phone
It is the users Phone
It is a videophone
It is a conference phone
It is a video conference phone
It provides easy access to and management of contact details
It provides access and management of voice/video mail The units functionality falls into two categories, user functions and systems functions.

User functions are any functions to which the user will have access.

System 10 functions are those required by I.T. to set up monitor and maintain the videophone 15 terminal and which are invisible to the normal user. Indeed, an important objective of the overall design is to make sure the user is presented with a very simple interface where he can use videophone 15 with virtually no training.

The following defines the basic feature set that is the minimum set of features that must be available.

The videophone 15 videophone acts as a conventional telephone when no user is logged onto the terminal. Its functionality must not depend at all on there being an associated PC 68.

The following describes the functionality of videophone 15 as a conventional phone in an office.

The terminal is able to have a conventional extension number on the PABX serving the site.

The terminal is able to accept an incoming call from any phone, whether on the PABX, on the videophone 15 network 40 or any external phone without discrimination.

The videophone 15 is able to accept calls from other compatible SIP phones.

An incoming call will generate a ring tone as configured (see set up screen requirements below). Specifically, the ring tone for videophone 15 calls that include Video will have an option for a distinguishing ring from audio only calls, whether from videophone 15 terminals or not.

An incoming call will generate an incoming call indication in the status area on the display 54. This display 54 must give as much Caller ID information as provided by the incoming call, or indicate that none is available.

It is possible to accept the incoming call:
  a) By pressing the call accept button on the incoming call status display 54.
  b) By picking up the handset—which will always accept all the offered options i.e. video and audio.

It is possible for the user to switch between handset and hands free (speaker phone) operation easily within a call. Picking up the handset within a call should automatically switch to handset mode from speaker phone mode. Replacing the handset without reselecting speaker phone mode will disconnect the call.

An on screen indication should be given of the mode, i.e. handset or hands-free.

The call status bar can display the call duration.

It is possible to adjust the volume of the incoming call by readily available controls on the main display 54. Headset and speaker volumes should be independently adjustable.

When in speaker phone mode, it is possible to return the handset to the handset stand without disconnecting the call.

A call is terminated:
  a) If the user presses the clear call button on the call status display 54.
  b) If the user replaces the handset when in handset mode and hands free is not selected.
  c) If the remote party hangs up the call provided it is reliably indicated to the videophone 15.

HOLD—It should be possible to place a call on Hold and to take the call off Hold again. Hold status should be displayed on the status display 54, with a button to allow that held call to be picked up.

CALL WAITING—Additional incoming calls must generate an incoming call indication in the status area of the display 54. It must not generate a call tone, unless enabled in the settings menu.

It is possible to accept a new incoming call in the current operating mode, i.e. handset or hands free, from the call accept button on the status display 54.

Accepting another incoming call will automatically place current calls on HOLD.

Pressing the "take off hold" button on any call must automatically transfer any other calls to Hold.

The number of simultaneous incoming calls that can be handled is set by the availability of status display 54 space. It must not be less than two calls.

When the number of current calls exceeds the number that can be handled, any other incoming calls:
  a) Get a busy tone or
  b) Are immediately forwarded to voice mail
  c) Are immediately forwarded to the configured forwarding number
  d) Are sent a recorded message.

As determined by the users "call forward busy" settings.

If incoming calls that are within the acceptable limit are not answered within a (configurable) interval, the calls are:

a) forwarded to voice mail b) forwarded to the pre-configured forwarding number c) sent a recorded message.

As determined by the user's "call forward no answer" settings.

CALL TRANSFER—It is possible for the user to easily transfer any call to any other number. The transfer function will put the call on hold and allow a new number to be dialed. Once ringing tone is heard, the user will have the option of completing the transfer. Alternatively, the user will be able to talk to the new number and then either initiate the transfer or first join all (three) parties in a conference call. If the latter, a function will be provided for the user to exit that conference call. In the event that there is no reply or just voice mail from the called terminal, the user will have the option of returning to the original call.

CALL FORWARD—It must be possible to set the phone up to automatically forward incoming calls to a pre-configured number. Call forwarding can be:

a) unconditional b) forward on busy c) forward on No Answer

CONFERENCE CALLS—It is possible to conference calls into an audio only conference, irrespective of the origin of the voice call. It is possible to conference at least 3 calls, i.e. a four-way conversation. It is required only to support a single conference at any one time, but still be able to accept one other incoming call as described in call waiting above. It is acceptable that the prototype be only able to accept one incoming call to a particular conference, i.e. an external bridge will be needed for non-videophone calls.

Options associated with the incoming call status display 54 will allow the user to add or remove a call from a conference connection.

It is possible to add calls to a conference irrespective of whether they are incoming or outgoing calls.

If remote conference user hangs up, that call leg must be cleared automatically.

Calls can be made hands free or whilst using the handset. Picking up the handset should bring up the dial pad if not in a call and connect the audio to the handset. An on-screen tone dial pad (i.e. numbers 1 through 0 plus '*' and '#') is required. In addition, there should be a pause button to insert a pause into a dialed string (for getting through PABXs unless the gateway(s) 70 can be programmed to remove this requirement) Consideration should be given to adding a+key and arranging that the+sign is automatically translated into the international access string for that location.

A key to correct entry errors (eg [BACK] key and a clear key to clear the entry are also required. A short press of the [BACK] key should remove the last entered number, a longer press continue to remove numbers, a press over should clear the number register.

The number display 54 should be automatically formatted to the local number format. [This may require a user setting to select country of operation as each country has a different style or if an international code is entered that code should be used as the basis of formatting the remaining part of the number.]

When connected to services that make use of the tone number pad to select features, the correct tones must be generated in the direction of that service, when the on screen key pad or the handset key pad is used. The dial-pad must be able to provide this function irrespective of how the call is initiated.

REDIAL—It is possible to redial the last dialed number through a single touch on an appropriately identified function.

AUTO REDIAL—It is possible to trigger an auto-redial mechanism, for example by holding the [REDIAL] button. Auto redial will automatically repeat the call if the previous attempts return a busy signal a number of tries.

CAMP ON BUSY—When making a call to a device that permits its support, a "Camp on Busy" function is available. Camp on Busy calls the user back once the called party is available. A message shall be generated to say 'this service is not available' if the called number cannot support Camp on Busy.

There can be an appropriate log on screen displayed when no user is logged onto the videophone 15.

A log of incoming, outgoing frequent and missed calls should be displayed on an appropriate view of the integrated dial screens. One or two touch access to 'last number re-dial' facility should always be available on the dial screens. Further definitions of these logs are given below.

To access the full set of features available on the videophone 15 terminal, a user must log into the terminal. A login screen is provided in which the user can enter his name and password. This can be the same as his normal network 40 access name and password The videophone 15 terminal will therefore make use of the sites user authentication services. Any screens needed to enable IT personnel to configure the videophone 15 to use these authentication services must be provided. Alternative methods of identifying the user are available, for example, the use of a smart card or ID fob. There is no requirement for the user to already be logged on to a PC 68 prior to logging in to a videophone 15 terminal.

Multiple users can be logged onto a single videophone 15 and distinct incoming ring tones for each user can be provided. The incoming call indication should also identify the called parties name and well as the calling parties name. If multiple users are logged onto a single videophone 15, all the call forwarding functions are specific to the user to whom the call is addressed.

If the user is already logged in at his PC 68, the action of logging onto the videophone 15 shall create an association between the PC 68 where the User was logged on and the videophone 15 terminal provided this is confirmed from the PC 68. It is possible for a user to be logged on to multiple videophone 15 terminals simultaneously. The active videophone 15 is the one on which any call for that user is answered first.

The home page screen contains a status area that is visible on all screens (except in full screen mode). Status includes the name of the logged on user—or "no user logged on". The User's "Presence" status, Icons for video and audio transmission, Voice mail "Message" indication and the date and time.

A "message" indication is lit and flashing if there is unheard voice mail on the user voicemail system 10. Pressing the indicator brings up the Voicemail handling screen.

Touching the Date time area gives access to the Calendar functions.

The home page has a control bar area that is visible across all screens (except in full screen mode).

The control bar gives direct access to the most frequently used call control features and access to all other functions. Icons should be used on the buttons, but text may also be used to emphasize functional purpose.

The control panel also has global controls for the microphone, Camera and Speakers 64. The controls should clearly indicate their operational state, e.g. ON or OFF and where possible Icons should be used.

A self-image is available that indicates both the picture being taken by camera and that portion that is visible to the remote end of the active call. It is possible to turn self-image on and off and to determine whether it is always on or only once an active call has been established.

It is possible to display the camera image in the main video area of the screen at any time, i.e. in a call, not in a call, etc. The image should be that for a single Video call and should overlay any other video present. It should be possible to request a full screen version of that video. This can be thought of as a digital mirror and allows the user to make sure he/she is happy with what the camera will/is show(ing).

It is desirable for diagnostic purposes that the user can also see the image after encoding and decoding, so that he is aware of the quality of the image that will be seen at the far end. If this mode is supported then both the camera direct and the encoded decoded image side by side. The user can capture his self image, for use as the image associated with his contact information.

The major part of the Home screen is allocated to an Integrated Dial functions. There are four main sub-functions, a speed dial display 54, a directories access display 54, a dial-pad and access to call logs. The dial-pad and access to call logs are to occupy the minimum screen area compatible with ease of use, maximizing the area available to the Speed Dial/ Contacts pages. The speed dial area is detailed first, any common requirements across all the main sub-functions are only detailed under speed dial and are implied for the other three functions. The function of the Dial area is to select a user to whom a call is to be made.

The speed dial area is as large as possible, consistent with the other requirements for the dial screen. >20 speed dial locations is adequate. Each location should be large enough to make the identification of the persons detailed stored at that location very easily readable at the normal operational distance from the screen say 3 feet.

The user's information stored in a speed dial location includes the persons name, 'presence status' if known, the number that will be called if that speed dial is selected and an icon to indicate whether the user supports video calls. The detailed information also stores what kind of video, e.g. videophone 15, compatible MPEG2, H261 etc.

The area provides a clear area to be touched to initiate a call. A thumbnail view of the person is included if available. A method of handling long names (i.e. names that do not fit in the space allocated on the Speed Dial button) is provided.

Conventional telephone numbers in standard international format i.e. "+country code area code number" are automatically translated to the external access plus the international access codes needed to make a call to this number.

The full contact details associated with a person on the Speed dial page is available. The contact details provide all the numbers at which the user can be reached and a means of selecting one of the numbers as the default number that is used on the Speed Dial page. It is possible to select and dial an alternative number for that user via this link to the contacts page.

The User information includes most recent call history for that person, for example the last 10 calls either incoming missed or outgoing. Just providing the 'last call' information would be an acceptable minimum functionality.

It is possible to edit the contact details associated with the Speed dial entry and or create a new contact entry for the Speed dial page. It is possible to copy an entry from the contacts, directories or call log screens onto the Speed Dial page. It is possible copy an entry from the Speed Dial page to the contacts or Directory screens. It is possible to delete a Speed dial entry, or to move that entry to another contacts page. (i.e. copy and then delete original).

It is possible to control the placing of users on the Speed Dial page. It should also be possible in some manner (color coding) to distinguish between different classes of Speed Dial users, i.e. business, family, colleagues, vendors, customers. The speed dial page may well contain names from multiple other categories in the contacts information. Some form of automatic organization is available, for example, last name first name company or by class followed by last name first name company etc.

It is possible to define a group of users as a single speed dial entry. It is acceptable if the group size is limited to the size of the maximum conference call. It is possible to select the Directories view from the Speed Dial page. The Directories view will occupy the same screen area as the Speed Dial page. It is possible select from the range of on-line directories to which videophone 15 has access. The default will be the Outlook and or Lotus Notes directory that contains the users main contact details. The name of the selected directory should be displayed.

The categories established by the user in his Outlook or Notes contacts list is available as selections. If the number of categories do not fit in the display 54 area, buttons are provided to scroll either up or down the list. The list should be organized alphabetically.

The Speed Dial category is the category used to populate the Speed Dial page. There is some indication on when the Speed dial page is full and it no longer possible to add further names to this contacts category, unless they replace an existing entry. The ability to order Speed dial entries in order of most recent call, i.e. the least used Speed Dial entry would be at the bottom. This would be used to see which entry was best candidate for deletion to allow a more used number to be entered.

It is possible to easily find and select an entry from the selected category, with the minimum of user input. The entry selection mechanisms must work for relatively short lists and for very long lists (10,000's of names). The mechanisms must include the ability to enter a text string on which to search. It is possible to select the sort order for the presented data, by last name, first name or organization. There is a method of correcting entry errors, and quickly re-starting the whole search.

It is desirable if each order of the search keys was significant and could be changed by the user. In other words for example pressing and holding the left most search key enables the user to select to search on Last Name, First Name or Company (or an extended list of attributes. This is useful for example for finding someone in a particular department, or at a particular location—"who is in Korea"). The second key then qualifies the first key search and so on. Thus, the keys are set Company, Last Name First Name; say Marconi, then do an alphabetic user search within last names at Marconi. Clearly when each sort category is selected there is some implied sub-ordering of entries with the same value in that category field. So for last name selected, the implied sub-order is first name then company, for company the implied sort order is last name first name, and for first name, say last name company.

The call log screen displays the most recent entries of three categories of calls, outgoing, incoming, and missed calls, with a clear indication of which category is selected. In addition there should be a "frequent" category, that lists numbers by the frequency of use, over the last (<200) calls of any type.

There should be access to the Dial Pad from the call log screen. The analysis of the value of providing a far greater degree of handling call log data is deferred.

At minimum, when the "message" is touched a connection is made to the users voice mail system 10, the voice mail for this user is entered and the dial-pad is displayed to control the voice mail using the conventional phone key presses. The larger part of the "voice-mail" screen should bring up buttons to access each feature of the mail system 10, for example Next Message, Previous Message, Play Message, Forward Message, Reply to Message, call sender, etc. with all the equivalents of key presses within each function e.g. start recording stop recording review recording delete recording etc. All the functions need to be on buttons, converted to the respective DMF tones.

It is desirable that the "Forward to" number or any voice mail command that requires a list of users numbers to be entered can be selected from the Speed Dial or Directory views and that selection automatically inserts just the appropriate part of the users number. This could be particularly useful in forwarding a voice message to a group. It is possible for the user to set the time and date on the videophone 15. It is desirable that the time and date can be set automatically by appropriate network 40 services.

It is desirable that Calendar functionality is available that is integrated with the users Outlook/Palm/Notes Schedule/Calendar application. The minimum requirement would be simply to view the appointments at any date, by day, week or month (as per Outlook or Palm screens) with changes and new entries only possible via the Outlook or Palm database.

It is likely that quite a few of the users will not maintain their own calendars and indeed may NOT have PCs 68 on their desk, but do need to view the information. Touching the User Status area of the status part of the screen allows a user to set his status. The user will have a range of Status options to choose from, including:

i) Available
ii) Busy—on a call where another call will not be accepted
iii) Do not disturb—not on a call but not interruptable
iv) Back in five minutes
v) Out of the office
vi) On Holiday A single call instance on the videophone 15 terminal supports from one incoming stream to the maximum number of streams in a conference. For Video conferencing, the Terminal will support at least four connections to other parties as part of a single conference call. It is possible to accept at least two independent audio only calls, even when a maximum size video conference call is present, so that an audio call can be consultation hold transferred. The videophone 15 is able to support at least three simultaneous "call instances", i.e. up to three independent calls. Only one call can be active, i.e. the call controls can be applied only to one call at a time. More than one call can be accepted, i.e. users audio and video are being transmitted on each accepted call, whether active or not. Calls in progress may also be placed on HOLD, when the users audio and video is not transmitted to the user on HOLD and the audio and video from that user is also suppressed.

Incoming calls status is shown in Control display 54 area. Calls themselves and in-call controls are shown in the main section of the display 54.

Call states are:
i) Incoming call
ii) Accepted and active—the user's audio (and video if a video call) are, subject to the various mute controls, connected to this call. Call controls apply to this call.
iii) Accepted and not active—as above, but the call controls do not apply to this call.
iv) Accepted and on hold—users audio (and video if a video call) are not being transmitted to this call.
v) Accepted and being transferred Call states are indicated on each call. Only one accepted call can be active. An accepted call is made active by touching in the call display 54 area associated with that call, or the call status in the control panel. Any previous active call is set not active. A second touch will turn off the active state. An incoming call indication indicates if the call is offering a video connection. No indication implies an audio only call. The incoming call indication will show the name(s) of the parties associated with that incoming call. This shows immediately if the user is being called one on one, or being invited to join a conference.

The user has the following options to handle an incoming call:
i) Accept the call as a voice only call
ii) Accept the call as a video call (voice is implied)
iii) Send to voice mail A setting is available to set the videophone 15 terminal to auto-answers incoming calls, up to the maximum number of supported calls. Auto-answer creates an audio and video connection if one is offered. Once a call is in progress, the Users status should be automatically changed to "In a call". The Users status will revert back to its previous state (typically "Available") once no calls are active.

The user is able to configure if call user data is also distributed. If the user already has one or more calls accepted and if all calls are on HOLD or not active, this call will create a new call instance if accepted. All the accepted but not active calls will continue to see and hear the user as he deals with this new call. If one of the accepted calls is accepted and active, the new call will be joined to that call and all parties to the call will be conferenced to the new caller, if the call is accepted.

If the user does not pick up after (>10) seconds, the call will automatically be forwarded as determined by the "Forward on No Answer" settings. As above the forwarding is specific to the user to whom the call is addressed. If the users status is marked "Do not disturb" or "Busy" or the "Busy" state has been set by there being the maximum number of calls being handled, the call is forwarded "immediately" as determined by the "Forward on Busy" and "Forward on Do not disturb" settings, as modified by the "show forwarded calls" setting if implemented.

Depending on the "show forwarded calls" settings, the user can chose to see the incoming call indication for (>5 seconds) before it is forwarded. (This means the user needs to take no action unless he wishes to pick up the call, rather than the positive action required on a call above.) This does not function if the Busy state is due to the videophone 15 already handling the maximum number of calls.

The ability to generate a (very short) text message that is sent with the call is a useful way of conveying more information about the importance of the call and how long it will take. The requirements associated with generating and adding a message to an outgoing call are dealt with below. If present, the incoming call text message should be displayed associated with the incoming call. The display 54 copes with the display of text messages on multiple incoming calls simultaneously. The text message is also stored in the incoming or missed call log.

Call parameter negotiation is limited to that needed to establish the call within the network 40 policy parameters and the current network 40 usage. Settings are provided to allow the user to specify his preference for calls to other videophone 15 terminals, for example always offer Video, never offer video, ask each call if I want to offer video or not.

Camp on Available is supported for calls to other videophone 15 users. This will initiate a call to the user once his status changes to "available". If the user to be called is a group, the calls will only be initiated once all members of the group are 'Available'.

A conference call is when one location in the Speed Dial or Directories list represents a group of people, each of which are to be participants in a call. The suggested process of implementing this feature is to make each call in turn and once active request confirmation that the call should be added to the conference. This gives an escape route if the call goes through to voice mail. Once the actions on the first caller are completed, i.e. in the call or rejected the next number is processed.

It is possible to create an outgoing call that is half-duplex, in other words that requests audio and or video from the called party, but does not transmit either on this type of call. This is pull mode. Equally, it is possible to create a push mode, where the outgoing call does send audio and or video, but does not require any audio or video back. This mode may be used to selectively broadcast content to unattended terminals, or terminals with users playing only a passive role in the conference.

The overall volume of the speakers 64, the handset and the headset are independently adjusting. The speaker can be turned ON and OFF. Turning the speaker off will also turn off the microphone. Status indicators show the status of the Speaker and Microphone.

The microphone can be turned off and turned back on. Status indicators show the status of the microphone mute.

The camera can be turned off and turned back on. Status indicators show the status of the camera mute.

In call controls work only on the active call. An accepted call is made active if it is not active, either by touching the call in progress status indicator in the control panel, or anywhere in the call display 54 area except for the specific in-call control function areas. Any other currently active call is turned in-active. The active call can be turned in-active by a subsequent press in the same area. A control is provided that hangs up the active call. In a conference call it clears all elements of the call instance.

A call must be accepted and active for the Conference control to function. Touching the Conference control will join the currently active call instance to the next call made active. Conference control will indicate it is active either until it is pressed again, making it inactive, or another call instance is made active. After all the calls in the now active call are joined to the Conferenced call instance the call becomes a single conferenced call and the Conference control active indication goes out. Just to re-state, conference selects the call to which other calls will be joined and then selects the call to join to that call.

The method of terminating one party to a conference call is for that party to hang-up. For a variety of reasons, the user may wish to have independent control on each part of a call instance. This can be achieved by a de-conference capability. For example, by touching the call instance for longer than three seconds, a sub-menu appears that allows the individual members of the call instance be identified and selected for de-conferencing. This call is then removed from the conference and established as a separate call instance, where all the normal controls apply, specifically it can be cleared.

The transfer function transfers the active call. When the transfer control is touched, the integrated dialing screen is displayed and the active call is placed on hold, but indicating that it is engaged in an in-call operation. The Transfer control indicates it is active, until it is pressed a second time, canceling the Transfer, or until the user selects and presses dial on the number to which he wishes the call to be transferred.

Once the outgoing call has been initiated, the Transfer control indicates a change of state, so that touching the control cause a 'blind' transfer and the call instance is removed from the screen. Alternatively, the user can wait until the called number answers, at which point a new call instance is created, allowing the user to talk to the called party, and the Transfer function changes state again, to indicate that pressing it again will complete the transfer and terminate both calls. Otherwise, the requirement is to go back to talking to the caller being transferred and re-start the transfer process or terminate the call. Transfer is the main mechanism whereby an 'admin' sets up a call and then transfer it to the 'boss'. In this case, it is essential that it is not possible for the admin to continue to 'listen into' the transferred call. This will be especially true in a secure environment.

The active call can be placed on HOLD by touching the HOLD control. In HOLD, the outgoing video and audio streams are suspended and an indication given to the remote end it is on HOLD The incoming audio and video streams are no longer displayed. The HOLD state is indicated on the call status display 54 on the control bar. The Hold control indicates hold is active if any call is on hold. Pressing HOLD again when the active call is in HOLD removes the HOLD and returns the call to the displayed state.

There is a control on the main control panel that brings up the home screen and gives access to all the other non-call functions. There is an indication that Main has been selected. Pressing Main a second time re-establishes the current call displays and de-selects Main. Separate controls are provided for each accepted and displayed party within a call, and for each call displayed. Adjusting the volume of the audio from each particular user is required. It is possible to individually mute audio and or video of each user displayed on the screen. There is a status indicator to indicate if audio or video mute is ON.

If more than one call instance can be displayed at any one time, for example, a conference call with two others, plus a new call to one other user, then it is possible to mute audio and or video for a complete call instance, for example mute the two party conference for audio, whilst speaking to the second call.

Requesting video on an audio only connection that could support video is provided. Accepting or rejecting a video request is provided. A video connection is established if the connection is agreed. A settings page item enables the user to always accept or always reject video requests.

It is possible to display the bearer channel parameters for each connection, i.e. the incoming and outgoing encoding rates for video if present and audio. In a call, controls work only on the active call. An accepted call is made active if it is not active.

It is possible to enable a 'bearer channel quality monitor' for any user. This monitor, a bit like a signal strength meter on a mobile, would show, for example, 100% Green bar when there were no errors or lost packets on the audio and video channels, a yellow bar once loss rate or the latency exceeds a predetermined rate and a red bar once it exceeds a higher rate. The time integral should be short, say 50 milliseconds as errors in this timeframe will affect the users video. So, for example, if the receiver sees video artifacts, but at the same time sees the monitor bar move yellow or red, he knows it is network 40 congestion induced.

Requesting a change in video encoding parameters, i.e. increase or decrease encoding rate, within the call is provided. Accepting or rejecting this request and a method of changing the outgoing video rate is provided. The videophone 15 generates a single outgoing encoding rate to all participants. It is possible for it to accept different incoming rates on all of the incoming streams.

A request for a side-bar with the ability to accept or reject the request is provided. If accepted, sidebar turns off the audio stream from both participants to everyone else, so they can have a private conversation, whilst continuing to hear all the discussion and continue to see and be seen by all the participants. The ability to send short messages both ways with the video and sidebar requests is provided.

Irrespective of whether the call is an incoming or outgoing call, the screen transition to the video view should be smooth. The audio may anticipate the video. The video should not be displayed until this transition can be made. (i.e. there should be no jumpy pictures, half formed frames etc in the transition to the video.) The transition to the user display 54 video screen should only start after the call is "in progress" and not at the time of initiating the call. The display of the video from the user should make maximum use of the area of the display 54 allocated to user display 54. An in display 54 control is able to convert this single call instance single user display 54 to a full screen display 54. Touching anywhere inside the "full screen" display 54 will revert to the standard display 54. In addition to the in call controls already mentioned, the users name should be displayed. The display 54 and the call instance on the control panel must indicate if the call is active or not, i.e. if the in call general controls will operate or not. With one call instance up, active inactive is by pressing on the call instance or anywhere on the main display 54 apart from the in call specific control areas.

The transition from a one call instance two party call should be smooth and should be initiated once the second call is "in progress". The display 54 should make maximum use of the display 54 area allocated to user display 54. If necessary, the videos can be clipped at each edge, rather than scaled, to fit the available area. There is no requirement for a full screen display 54 for two or more up. In addition to the in call controls already mentioned, the user name should be displayed for each party. There must be an indication that both parties are part of a single call instance. The display 54 and the call instance on the control panel must indicate if the call is active or not. The incoming video can be progressively clipped to fit the available display 54 area as more parties are added to the video call.

In two call instances both single party calls, there are two separate calls to single users, both of which are displayed. The on-screen display 54 and the call control indication clearly indicate these are two separate and independent calls and also indicate which if any is active. If either call is placed on HOLD, that call is no longer displayed and the display 54 reverts to a single call instance single call display 54.

The user area should be capable of displaying any of the following combinations in addition to those described above.
Four call instances each single party calls;
Three call instances where one call can be two party and the others are single party calls;
Two call instances where one can be up to three party or two can be two party call.

The requirements of a "CNN" style display 54 are those of the single call instance single call above, including the ability to have a full screen display 54. It is also possible to display "CNN" style call in half the screen and use the other half for one or two user display areas, the latter as two independent call instances or a single two party call instance.

The ability to provide various levels of encryption for the voice and data streams is provided. Access to diagnostic, test, measurement and management facilities shall make use of SMF (simple management framework), in other words access will be possible to all facilities in three ways, via SNMP, via the web and via a craft interface. The videophone 15 terminal must be remotely manageable, requiring no on site IT expertise for every day operation, or for software upgrades that do bug fixes. Fault diagnosis is also possible remotely and be able to determine if the problem is with the unit hardware, the units configuration, the units software, the network 40 or the network 40 services. Management can assume IP connectivity, but must assume a relatively low bandwidth connection to the videophone 15.

Under normal operation, the videophone 15 should perform a shortened version of hardware system 10 test as it powers up. If this fails, the videophone 15 should display a boot failure message on the main screen. The terminal can be forced into an extended hardware diagnostic mode. This could be by attaching a keyboard to a USP port, or by pressing in the top right hand corner of the touch screen 74 as the unit powers up. This mode would give access to the underlying operating system 10 and more powerful diagnostics, to determine if the there is a hardware failure or not.

A series of simple tests can be included that the user can run in the event that the videophone 15 passes the boot-up test but is not providing the correct functionality for the user. The terminal provides a technical interface, in association with a local keyboard (and mouse) to assist in diagnosing unit or system 10 problems. This would give access to the various diagnostics for audio and video, etc.

It is possible to download safely new versions of the videophone 15 terminal software under remote control. By safely, it means being able to revert to the previous version if faults occur in the downloaded version, without local intervention (i.e. someone having to install a CD). It is possible to read the software version number of the software on a particular videophone 15 terminal, and the units hardware serial number, assembly revision number and the serial number and assembly revision number of key sub-assemblies via the management interfaces. In the event of a system 10 crash, the videophone 15 should store or have stored information to assist in the diagnosis of the cause of that crash. This information must be retrievable on line from a remote site for analysis once the videophone 15 has re-booted.

The videophone 15 keeps a running log of all actions, events and status changes since power up, within the limits of the storage that can be allocated to this feature. It should enable at least one month's worth of activity to be stored. This data may need to be in a number of categories, for example a secure category that contains the users data, such as the numbers he called would only be releasable by the user. Generic data, such as number of calls, call state (i.e. number of call instances and endpoints per instance, encoder 36 and decoder 34 characteristics, bearer channel error reports and so on are not so sensitive information. It may be useful to be able to record every key press as a way of helping diagnose a system 10 level issue and re-create the chain of events.

It is possible for the videophone 15 to copy the exchanges at the control plane level at both the IP level and the SIP level, to a remote diagnostic terminal (the equivalent of having a line monitor remotely connected to the videophone 15 terminal). Terminal management will monitor a number of parameters, for example, network 40 quality. It must be possible to set thresholds and generate alarms when those thresholds are exceeded. Both the ATM interface and the Ethernet interface have standard measurements (rmon like, for example) that should be available for the videophone 15. The videophone 15 should be able to send those alarms to one or more Network Management Systems.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A telecommunications system comprising:
a network; and
a first node, a second node, and at least a third node in communication with each other through the network, the first node sending a first video stream having a frame rate of a live scene at the first node, a second video stream of the live scene at the first node where the second video stream has a lower frame rate than the frame rate of the first video stream and is independent and is different than the first video stream and an audio stream of the live scene at the first node to the second and third nodes as part of a video conference, the second and third nodes playing the audio stream and either the first video stream or the second video stream, the second video stream requiring less resources of the network, the second and third nodes have a display screen and when the second or third nodes display the first video stream, they display the first video stream as a large image across an area of greater than or equal to 20% of the screen, and when the second and third nodes display the second video stream, they display the second video stream as a small image across an area of less than 20% of the screen, the second node sends a first video stream of a live scene at the second node to the first and third nodes as part of the video conference.

2. A system as described in claim 1 wherein the second node sending a first video stream of a live scene at the second node, a second video stream of the live scene at the second node where the second video stream at the second node is different than the first video stream at the second node and an audio stream at the live scene at the second node to the first and third nodes, the first and third nodes playing the audio stream and either the first video stream or the second video stream of the second node.

3. A system as described in claim 2 wherein the first video stream has a frame rate greater than or equal to 25 frames per second and the second video stream has a frame rate less than 25 frames per second.

4. A system as described in claim 3 including a fourth node in communication with the first, second and third nodes through the network, which sends a television video stream of a television channel to the first, second and third nodes; the first, second and third nodes able to display the television video stream on the screen along side the first video stream.

5. A system as described in claim 3 wherein the second node sends a first video stream of a scene at the second node, a second video stream of the scene at the second node and an audio stream of the scene to the third node; and wherein the third node has a display controller which controls the image that appears on the screen and which plays each first video stream from each node alongside each other on the screen of a third node.

6. A system as described in claim 5 wherein the network is an Ethernet or ATM network.

7. A system as described in claim 6 wherein the first and second video streams and the audio streams of the first and second nodes are sent over the network for a video conference call, with no conferencing bridge or MCU used for the video conference call.

8. A system as described in claim 7 wherein each node uses ATM point to multipoint streams for the video conference call.

9. A system as described in claim 8 wherein the third node predetermines which of the first or second video streams from the first or second nodes to display.

10. A system as described in claim 9 wherein the third node chooses to display the first video stream from the first or second nodes if a user in the respective scene at the first or second nodes is talking, or the third node has predetermined to display the first video stream of the first or second nodes.

11. A system as described in claim 10 wherein the first video stream of the first and second nodes is in MPEG-2 format when it is sent over the network.

12. A system as described in claim 11 wherein the first and second nodes use continuous P to place the first video stream of the first and second nodes in the MPEG-2 format.

13. A system as described in claim 12 wherein the first and second nodes clip the first video streams of the scene of the first and second nodes, respectively.

14. A system as described in claim 13 wherein the first and second nodes clip the first video stream of their respective scenes by removing a portion of the first video stream that is associated with a location of the respective scene that has no user.

15. A system as described in claim 14 wherein the first and second nodes only send an audio stream of the scene of the first and second nodes, respectively, if there is a noise above a predetermined threshold at the respective scene.

16. A system as described in claim 15 wherein the first node has an automatic presence sensor which determines whether a user is present at the scene at the first node, and produces a presence indicator of whether the user is at the first node, the first node sends the presence indicator to the second and third nodes.

17. A system as described in claim 16 wherein the first node produces an alert signal to alert any user in the scene at the first node that the presence indicator is going to be formed in a predetermined time.

18. A system as described in claim 17 wherein the first node includes an imaging means for taking a video picture of the first scene and producing the first video stream.

19. A system as described in claim 18 including an encoder in communication with the imaging means which compresses and encodes the first video stream into a desired format without frame buffering.

20. A system as described in claim 19 wherein the first node includes a Field Programmable Gate Array in communication with the encoder, which packetizes the first video stream, and also receives the first video stream from the imaging means and produces the second video stream of the first node and packetizes the second video stream.

21. A system as described in claim 20 wherein the first node includes a network interface in communication with the Field Programmable Gate Array and the network and transfers the first video stream of the first node to the network, and receives the first video stream from the second node and sends it to the Field Programmable Gate Array.

22. A system as described in claim 21 wherein the first node includes microphone means for receiving sound from the first scene and producing the audio stream of the first node.

23. A system as described in claim 22 wherein the first node includes speaker means in communication with the network interface for playing the audio stream from the second node.

24. A system as described in claim 23 wherein the first node includes a DSP which packetizes the audio stream of the first node and provides the audio stream to the Field Programmable Gate Array which transfers the audio stream of the first node to the network interface which transfers the audio stream of the first node to the network, and receives the audio stream of the second node from the Field Programmable Gate Array.

25. A system as described in claim 24 wherein the first node includes an audio interface which receives the audio stream of the first node from the microphone means and digitizes it and provides it to the DSP, and converts the audio stream from the second node that it receives from the DSP to an analog form for the speaker means to play.

26. A system as described in claim 25 wherein the network interface time stamps packets of the audio stream and the video stream of the first node before they are sent to the network, and aligns the packets of the video stream and audio stream of the second node that the first node receives by time stamp so when the video stream and audio stream of the second node are played by the first node, the associated sound with the image of the scene of the second node is played.

27. A system as described in claim 26 wherein the first node includes a receive memory in which the first video stream from the second node is received and stored, and a main controller connected to the network interface, the encoder, the Field Programmable Gate Array and the DSP to control them, the main controller instructing the network interface to choose the first video stream of the second node and send it to the receive memory, the main controller decodes and expands the first video stream of the second node stored in the receive memory and sends it to the display controller.

28. A system as described in claim 27 wherein the first node includes an LCD controller connected to the display controller, and the display screen includes a panel display connected to the LCD controller, the LCD controller receives the first video stream of the second node from the display controller and prepares the first video stream of the second node for display on the panel.

29. A system as described in claim 28 including a touch screen on which buttons associated with functions appear, and a touch screen controller connected to the touch screen and the main controller for transferring information regarding buttons which have been touched on the touch screen by a user to the main controller.

30. A system as described in claim 29 wherein the first node includes a decoder for converting the first video stream from the imaging means of the scene of the first node to digital form and providing it to the encoder and the Field Programmable Gate Array, the decoder connected to the Field Programmable Gate Array and the encoder, the decoder also receiving the television video stream and other analog form video streams and converting them to digital form.

31. A system as described in claim 30 wherein the imaging means includes an analog video camera which is in communication with the decoder, a digital video camera which is in communication with the encoder and the Field Programmable Gate Array, or a fire wire camera in communication with the Field Programmable Gate Array, the Field Programmable Gate Array providing any video stream it receives from the fire wire camera to the encoder.

32. A system as described in claim 31 wherein the DSP provides for stereo echo cancellation of the audio stream of the scene of the first node, the encoder provides for the first video stream of the first node to have a resolution of at least 720 by 640 pixels, and the microphone means and the speaker means are full duplex.

33. A system as described in claim 32 wherein the DSP monitors the microphone means for the noise level produced by the speaker means and adjusts the speaker means to maintain a desired noise level.

34. A system as described in claim 33 wherein the main controller recognizes a command by the user to automatically call another user for a video conference, and use the command to announce to the other users that the other user is being requested for the video conference.

35. A system as described in claim 34 wherein the first node has video mail when the first node is not able to accept a video call.

36. A system as described in claim 35 including a server that is in communication with the network and the first node, which receives the video call for the first node when the first node does not receive the video call, stores a video message associated with the video call that the first node does not receive, and sends a video call waiting message to the first node that there is a video message waiting to be shown to the first node.

37. A system as described in claim 36 wherein the first node has a plurality of display panels connected to the display controller, with the images of the first video streams from different nodes being displayed on the panels alongside each other as though the plurality of panels is one continuous panel.

38. A system as described in claim 37 wherein the first node includes a second imaging means for producing the first video stream of the first node having a different view of the scene at the first node than the imaging means.

39. A system as described in claim 38 wherein the main controller sends the second video stream of the first node from the Field Programmable Gate Array to the display controller to be displayed on the panel so the user of the first node can see the scene of the first node on the display panel.

40. A system as described in claim 39 wherein the first video stream has a bit rate greater than or equal to 1.5 Mbits per second and the second video stream has a bit rate less than 1.5 Mbits per second.

* * * * *